(12) United States Patent
Kadowaki et al.

(10) Patent No.: US 10,353,132 B2
(45) Date of Patent: Jul. 16, 2019

(54) DISPLAY DEVICE

(71) Applicant: Sharp Kabushiki Kaisha, Sakai, Osaka (JP)

(72) Inventors: Shinya Kadowaki, Sakai (JP); Takeshi Ishida, Sakai (JP); Mitsuhiro Murata, Sakai (JP); Ryuzo Yuki, Sakai (JP); Hisashi Watanabe, Sakai (JP); Takeshi Masuda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 6 days.

(21) Appl. No.: 15/539,348

(22) PCT Filed: Dec. 18, 2015

(86) PCT No.: PCT/JP2015/085463
§ 371 (c)(1),
(2) Date: Jun. 23, 2017

(87) PCT Pub. No.: WO2016/104348
PCT Pub. Date: Jun. 30, 2016

(65) Prior Publication Data
US 2017/0351019 A1    Dec. 7, 2017

(30) Foreign Application Priority Data
Dec. 26, 2014  (JP) .................. 2014-265562

(51) Int. Cl.
*F21V 8/00*     (2006.01)
*G09F 9/00*    (2006.01)
(Continued)

(52) U.S. Cl.
CPC ......... *G02B 6/0055* (2013.01); *G02B 6/0083* (2013.01); *G02B 6/0088* (2013.01);
(Continued)

(58) Field of Classification Search
None
See application file for complete search history.

(56) References Cited

U.S. PATENT DOCUMENTS

| 7,946,758 B2 * | 5/2011 | Mooring | ............... G04B 37/005 |
| | | | 368/276 |
| 2010/0277664 A1 * | 11/2010 | Kim | ..................... G02B 6/0085 |
| | | | 349/58 |

FOREIGN PATENT DOCUMENTS

JP   2009-199971 A   9/2009

\* cited by examiner

*Primary Examiner* — Nimeshkumar D Patel
*Assistant Examiner* — Jacob R Stern
(74) *Attorney, Agent, or Firm* — ScienBiziP, P.C.

(57) ABSTRACT

A liquid crystal display device includes a liquid crystal panel, a liquid crystal panel flexible circuit board, and a backlight unit. The backlight unit includes LEDs, a light guide plate, a chassis, and an LED board. The light guide plate has an outer shape conforming to an outer shape of the liquid crystal panel. The chassis including a sidewall portion which surrounds the light guide plate and the LEDs. The LED board has an outer shape conforming to the outer shape of the light guide plate. The LEDs are mounted on the LED board at intervals in the circumferential direction. The LED board includes LED mount portions, and LED interval portions. The LED interval portions include a cut-out LED interval portion. Between the cut-out LED interval portion and the sidewall portion, a liquid crystal panel flexible circuit board passing space is provided.

12 Claims, 17 Drawing Sheets

(51) Int. Cl.
*G02F 1/1333* (2006.01)
*G02F 1/1335* (2006.01)
*G02F 1/1345* (2006.01)
*G02F 1/1368* (2006.01)

(52) U.S. Cl.
CPC ....... *G02B 6/0091* (2013.01); *G02F 1/13338* (2013.01); *G02F 1/13452* (2013.01); *G02F 1/133308* (2013.01); *G02F 1/133615* (2013.01); *G09F 9/00* (2013.01); *G02B 6/0051* (2013.01); *G02B 6/0068* (2013.01); *G02F 1/1368* (2013.01); *G02F 1/133514* (2013.01); *G02F 2001/133302* (2013.01); *G02F 2001/133317* (2013.01); *G02F 2201/56* (2013.01)

DISPLAY DEVICE

TECHNICAL FIELD

The present invention relates to a display device.

BACKGROUND ART

Conventionally, liquid crystal display devices are used as a display device for small-sized, thin devices, such as notebook computers, portable telephone devices, and portable TVs. Liquid crystal display devices are also increasingly used as a display device in vehicle instruments for displaying vehicle information and traffic information. The liquid crystal display devices are provided with a lighting unit for illuminating a liquid crystal panel. The lighting unit typically includes a light source, and a light guide plate which converts a light bundle from the light source into a planar light bundle optimized for illuminating the liquid crystal panel. An example of this type of lighting unit is disclosed in Patent Document 1 indicated below. Patent Document 1 discloses a lighting unit provided with a light source and a light guide member. Light emitted from the light source enters a light entry portion of the light guide member and exits from a light exit portion of the light guide member to illuminate a liquid crystal panel which is the member to be illuminated. The light guide member has a substantially circular shape, and is provided with light sources. The light sources are disposed on a peripheral edge of the light guide member such that the directions of light emitted from the light sources can all intersect each other.

PRIOR ART DOCUMENT

Patent Document

Patent Document 1: Japanese Unexamined Patent Publication No. 2009-199971

Problem to be Solved by the Invention

In Patent Document 1, the light sources arranged to surround the light guide member are mounted on a substrate having a substantially circular shape conforming to the outer shape of the light guide member. One end of a flexible circuit board flexible circuit board for transmitting various signals concerning display is connected to a liquid crystal panel. The other end of the flexible circuit board is connected to a control board disposed on the back side of the lighting unit lighting unit. Accordingly, the flexible circuit board has a portion between the one end and the other end, the portion being passed outside the light sources with respect to the radial direction of the lighting unit while being folded. However, as described above, the substrate on which the light sources are mounted has the substantially circular shape conforming to the outer shape of the light guide member, and thus the space for passing the flexible circuit board inevitably has a positional relationship to lie on the outside radially of the lighting unit with respect to the substrate. This creates the problem of having to partly widen the frame of the lighting unit for the space for passing the flexible circuit board.

DISCLOSURE OF THE PRESENT INVENTION

The present invention was made in view of the above circumstances, and an object of the present invention is to enable a frame to be made narrow.

Means for Solving the Problem

A display device according to the present invention includes a display panel, a flexible circuit board connected to the display panel, and an lighting unit configured to irradiate the display panel with light. The lighting unit includes light sources, a light guide plate having an outer shape conforming to an outer shape of the display panel, and configured to guide light from the light sources, a case holding the light sources and the light guide plate therein, and including a sidewall portion surrounding at least the light guide plate and the light sources, and a light source board having an outer shape conforming to the outer shape of the light guide plate, and on which the light sources are mounted side by side at intervals along a circumferential direction of the light source board to surround the light guide plate. The light source board includes at least light source mount portions in which the light sources are respectively mounted, and light source interval portions disposed between the light source mount portions that are adjacent with respect to the circumferential direction. The light source interval portions include a cut-out light source interval portion with a cut-out outer edge. The lighting unit includes a flexible circuit board passing space between the cut-out light source interval portion and the sidewall portion for passing the flexible circuit board therethrough.

In this way, the light emitted from the light sources mounted on the light source board side by side at intervals to surround the light guide plate along the circumferential direction thereof is guided by the light guide plate and then applied to the display panel, and thereby utilized for displaying an image. The light source interval portions of the light source board include the cut-out light source interval portion with the cut-out outer edge. The flexible circuit board is passed through the flexible circuit board passing space provided between the cut-out light source interval portion and the sidewall portion of the case. Accordingly, compared with if the flexible circuit board passing space is provided between the light source mount portion and the sidewall portion, or if the flexible circuit board passing space is provided between a light source interval portion without the cut-out outer edge and the sidewall portion, a narrow frame can be obtained.

The present invention may preferably include the following embodiments.

(1) The flexible circuit board may include divided flexible circuit boards, and the light source interval portions may include the cut-out light source interval portions which are equal to or greater in number than the divided flexible circuit boards. In this way, the divided flexible circuit boards are respectively passed through the flexible circuit board passing spaces provided between the cut-out light source interval portions and the sidewall portion, the cut-out light source interval portions being equal to or greater in number than the divided flexible circuit boards. The configuration in which the flexible circuit board includes divided flexible circuit boards is preferable when the various signals transmitted by the flexible circuit board are adapted for greater capacities, i.e., when the resolution or screen size of the display panel is increased, for example.

(2) The light sources may be disposed on the light source board at equal intervals with respect to the circumferential direction. When the flexible circuit board includes divided flexible circuit boards, the width of each of the divided flexible circuit boards can be made narrower than the interval between the light sources disposed adjacent to each other at equal intervals with respect to the circumferential direction, and each of the divided flexible circuit boards can be passed through the flexible circuit board passing space provided between the cut-out light source interval portion and the sidewall portion. Because the light sources are disposed at equal intervals with respect to the circumferential direction, the light from the light sources can be made to enter the light guide plate uniformly with respect to the circumferential direction, whereby brightness variations in the light emitted via the light guide plate can be prevented or reduced.

(3) The light source interval portions that are adjacent via the light source mount portions with respect to the circumferential direction may include the cut-out light source interval portions. The divided flexible circuit boards may be connected to the display panel respectively through the flexible circuit board passing spaces provided between the cut-out light source interval portions and the sidewall portion. In this way, the divided flexible circuit boards are connected to the display panel in a concentrated manner with respect to the circumferential direction. Accordingly, this configuration is preferable in terms of reducing the takt time, for example, in the step of connecting the divided flexible circuit boards to the display panel during the manufacturing process.

(4) The display device may include a touch panel having an outer shape conforming to the outer shape of the display panel, and a touch panel flexible circuit board connected to the touch panel. The cut-out light source interval portion may include a cut-out light source interval portion forming a touch panel flexible circuit board passing space with the sidewall portion for passing the touch panel flexible circuit board therethrough. In this way, the touch panel flexible circuit board connected to the touch panel is passed through the touch panel flexible circuit board passing space provided between the cut-out light source interval portion and the sidewall portion of the case. Accordingly, compared with if the touch panel flexible circuit board passing space is provided between the light source mount portion and the sidewall portion, or the touch panel flexible circuit board passing space is provided between a light source interval portion without the cut-out outer edge and the sidewall portion, a narrow frame can be obtained.

(5) The touch panel flexible circuit board may include divided touch panel flexible circuit boards, and the light source interval portions may include the cut-out light source interval portions which are greater in number than the divided touch panel flexible circuit boards. In this way, the flexible circuit board and the divided touch panel flexible circuit boards are respectively passed through the flexible circuit board passing spaces and the touch panel flexible circuit board passing spaces provided between the cut-out light source interval portions grater in number than the divided touch panel flexible circuit boards and the sidewall portion. The configuration in which the touch panel flexible circuit board includes divided touch panel flexible circuit boards is preferable when the various signals transmitted by the touch panel flexible circuit board are adapted for greater capacities, i.e., when the sensitivity or screen size of the touch panel are increased, for example.

(6) The light source interval portions that are adjacent via the light source mount portions with respect to the circumferential direction may include the cut-out light source interval portions, and the divided touch panel flexible circuit boards may be connected to the touch panel respectively through the touch panel flexible circuit board passing spaces provided between the cut-out light source interval portions and the sidewall portion. In this way, the divided touch panel flexible circuit boards are connected to the touch panel in a concentrated manner with respect to the circumferential direction. Accordingly, this configuration is preferable in terms of reducing the takt time, for example, in the step of connecting the divided touch panel flexible circuit boards to the touch panel during the manufacturing process.

(7) Some of the light source interval portions may include the cut-out light source interval portions. In this way, when the display panel with the flexible circuit board connected thereto is installed, the flexible circuit board can be positioned with respect to the circumferential direction by using as a marker the cut-out light source interval portions constituting some of the light source interval portions. In this way, an increase in production efficiency can be achieved. In addition, compared with if all of the light source interval portions are the cut-out light source interval portions, the leakage light that may be caused by the cut-out light source interval portions can be suppressed.

(8) All of the light source interval portions may include the cut-out light source interval portions. When all of the light source interval portions are the cut-out light source interval portions, the freedom of arrangement with respect to the circumferential direction is increased in the light source board when the light source board is installed. In this way, an increase in production efficiency can be achieved.

(9) The sidewall portion may include, in a portion facing the flexible circuit board passing space, a positioning portion configured to abut on each of the ends of the flexible circuit board with respect to the circumferential direction. In this way, because the flexible circuit board can be positioned by the positioning portion with respect to the circumferential direction position, positional displacement of the flexible circuit board with respect to the circumferential direction can be regulated.

(10) The light source board may have a circular outer shape, and the positioning portion may abut on each of the ends of the cut-out light source interval portion with respect to the circumferential direction. In this way, because the light source board including the cut-out light source interval portion is positioned by the positioning portion with respect to the circumferential direction, the circular light source board can be prevented from rotating.

(11) The light source board may have a ring-shape. In this way, it becomes possible to dispose the light source board to lie on either the opposite side of the light guide plate from the display panel side, or the dispose display panel side. In this way, the freedom of design of the lighting unit and the display device is increased.

Advantageous Effect of the Invention

According to the present invention, a narrow frame can be obtained.

MODE FOR CARRYING OUT THE INVENTION

First Embodiment

Figure 1:
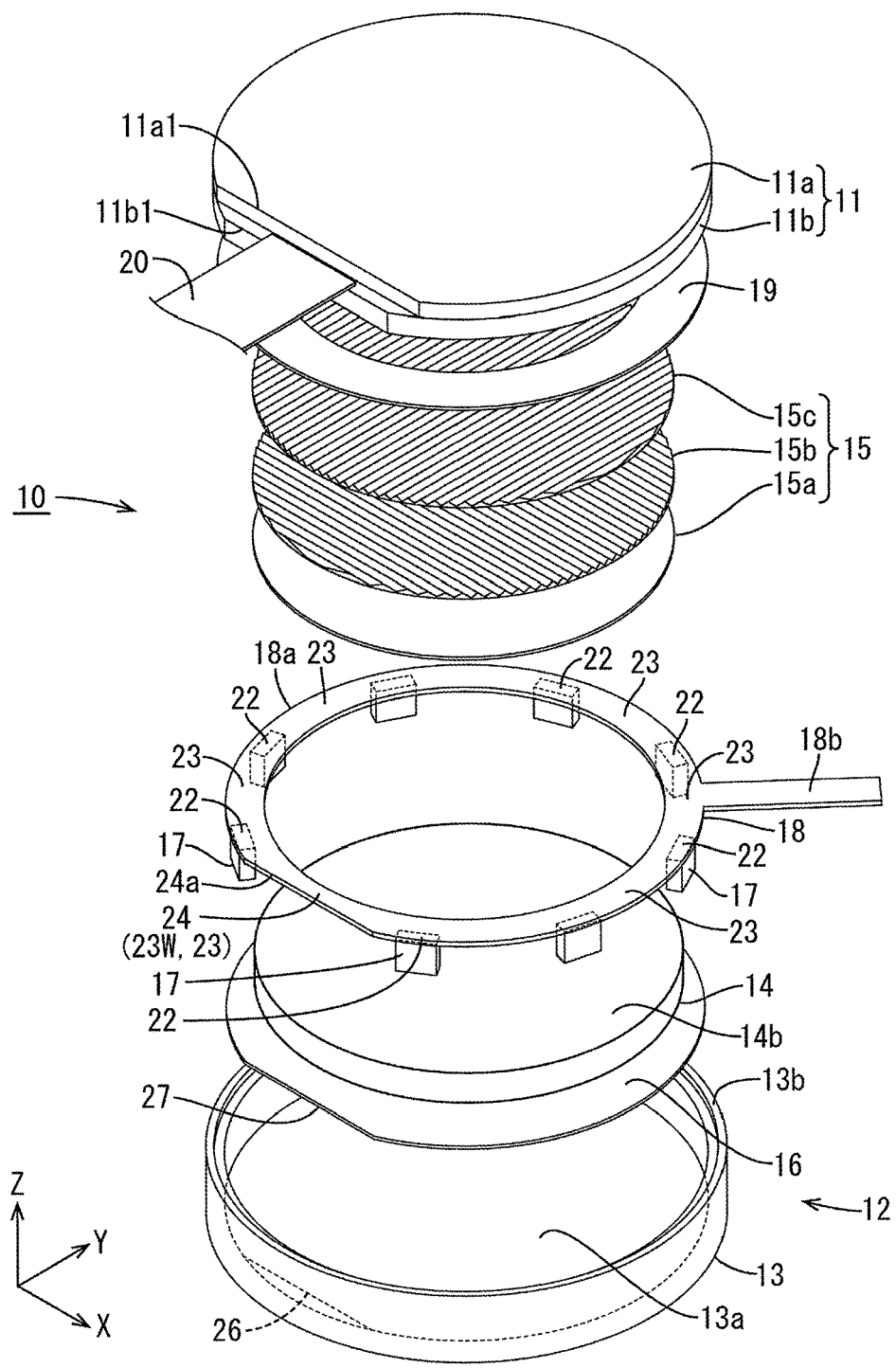
FIG. 1 is an exploded perspective view of a liquid crystal display device according to a first embodiment of the present invention.

A first embodiment of the present invention will be described with reference to FIG. 1 to FIG. 6. In the present embodiment, a liquid crystal display device (display device) 10 provided with a liquid crystal panel 11 as a display panel will be described by way of example. In some of the drawings, an X-axis, a Y-axis, and a Z-axis are shown, and the axial directions correspond to the directions illustrated in the drawings. Upper and lower directions are indicated with reference to FIG. 3 and FIG. 4, the top of the figures corresponding to an upper side and the bottom corresponding to a lower side.

The liquid crystal display device 10 as a whole has a substantially circular shape. As illustrated in FIG. 1, the liquid crystal display device 10 includes, at least, a liquid crystal panel (display panel) 11 configured to display an image, and a backlight unit backlight unit (lighting unit) 12 which is disposed on the lower side with respect to the liquid crystal panel 11 and which supplies the liquid crystal panel 11 with light for the display. While not illustrated, it is also possible to adopt a configuration in which the liquid crystal display device 10 is provided with a bezel for holding the outer peripheral ends of the liquid crystal panel 11 with the backlight unit backlight unit 12. The liquid crystal display device 10 according to the present embodiment may preferably be used for various electronic devices (not illustrated) which include, but are not limited to: portable telephones (including smartphones and the like); notebook computers (including tablet notebook computers and the like); portable information terminals (including electronic books, PDAs and the like); digital photo frames; and portable game machines. Accordingly, for example, the liquid crystal panel 11 of the liquid crystal display device 10 preferably has a screen dimension which is on the order of, but not limited to, several inches to several tens of inches, which are generally classified as being small-sized or middle-sized.

Figure 3:
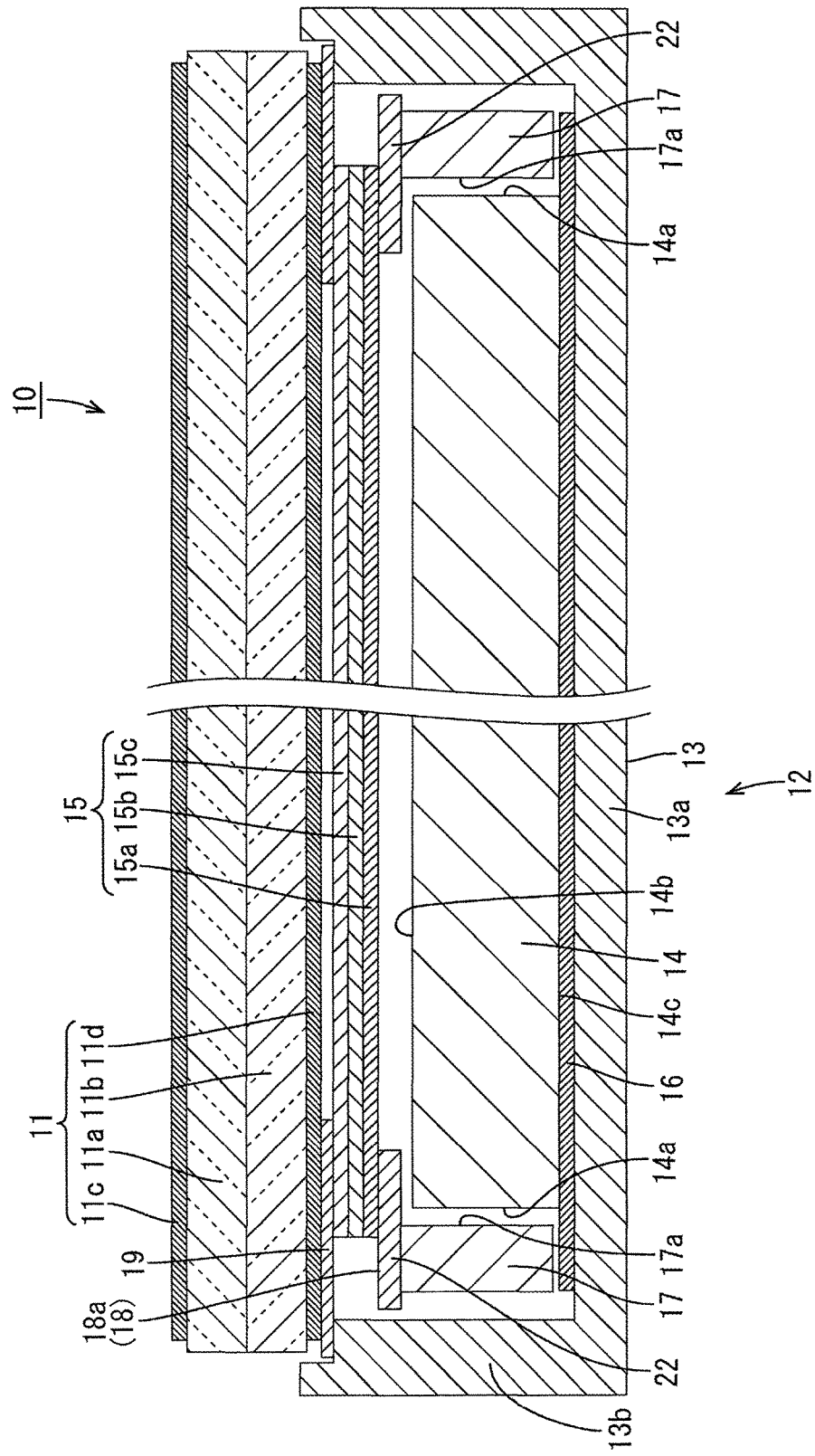
FIG. 3 is a cross sectional view taken along line iii-iii of FIG. 2.

The liquid crystal panel 11 will be described in detail. The liquid crystal panel 11, as illustrated in FIG. 1, has as a whole a substantially circular shape as viewed in plan. The liquid crystal panel 11, as illustrated in FIG. 3, is provided with a pair of glass substrates 11a, 11b which are substantially transparent and highly light transmissive, and a liquid crystal layer (not illustrated) which is interposed between the substrates 11a, 11b, the liquid crystal layer including liquid crystal molecules including material of which the optical characteristics can be changed by applying an electric field. The substrates 11a, 11b are bonded to each other, using a sealing agent not illustrated, with a gap corresponding to the thickness of the liquid crystal layer maintained therebetween. The liquid crystal panel 11 includes a substantially circular-shaped display region (active area) disposed at the center side of the screen to display an image, and a substantially ring-shaped (substantially circular frame-shaped or doughnut-shaped) non-display region (non-active area) which is disposed on the screen outer periphery to surround the display region and in which no image is displayed. The liquid crystal panel 11 is configured to display an image in the display region by utilizing light supplied from the backlight unit backlight unit 12. The liquid crystal panel 11 has a light output side on the upper side. To the outer sides of the substrates 11a, 11b, polarization plates 11c, 11d are respectively affixed.

One of the substrates 11a, 11b of the liquid crystal panel 11 which is on the upper side (front surface side) includes a CF substrate 11a, and the one on the lower side (back surface side) includes an array substrate 11b. On an inner surface side (liquid crystal-layer side; the surface side opposing the CF substrate 11a) of the array substrate 11b, a number of thin-film transistor (TFT) as switching elements and pixel electrodes are arranged in a matrix (in rows and columns). The TFTs and the pixel electrodes are surrounded by gate wiring and source wiring disposed in a grid. The gate wiring and the source wiring are configured to be respectively supplied with image signals by a driver (not illustrated). The pixel electrodes disposed in a rectangular region surrounded by the gate wiring and source wiring include transparent electrodes of indium tin oxide (ITO) or zinc oxide (ZnO), for example. On the other hand, on the inner surface side of the CF substrate 11a, a number of color filters are arranged in a matrix at positions corresponding to the respective pixels. The color filters are arranged such that the three colors of R, G, and B are alternated. Between the color filters, a light shield layer (black matrix) for preventing color mixing is formed. On the surfaces of the color filters and the light shield layer, counter electrodes are provided to oppose the pixel electrodes on the array substrate 11b side. On the inner surface sides of the substrates 11a, 11b, alignment films (not illustrated) for positioning the liquid crystal molecules included in the liquid crystal layer are respectively formed.

Figure 4:
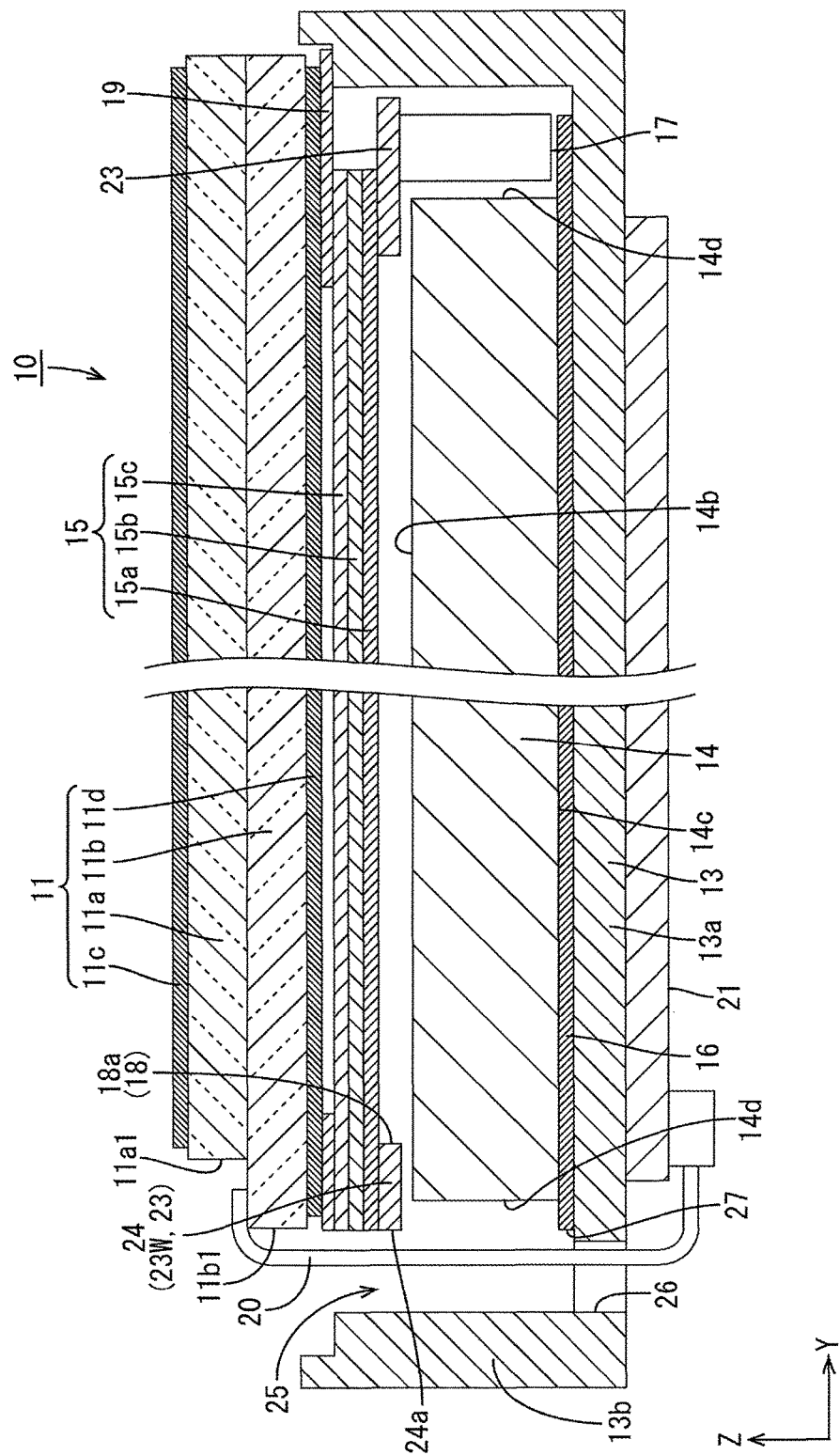
FIG. 4 is a cross sectional view taken along line iv-iv of FIG. 2.
Figure 5:
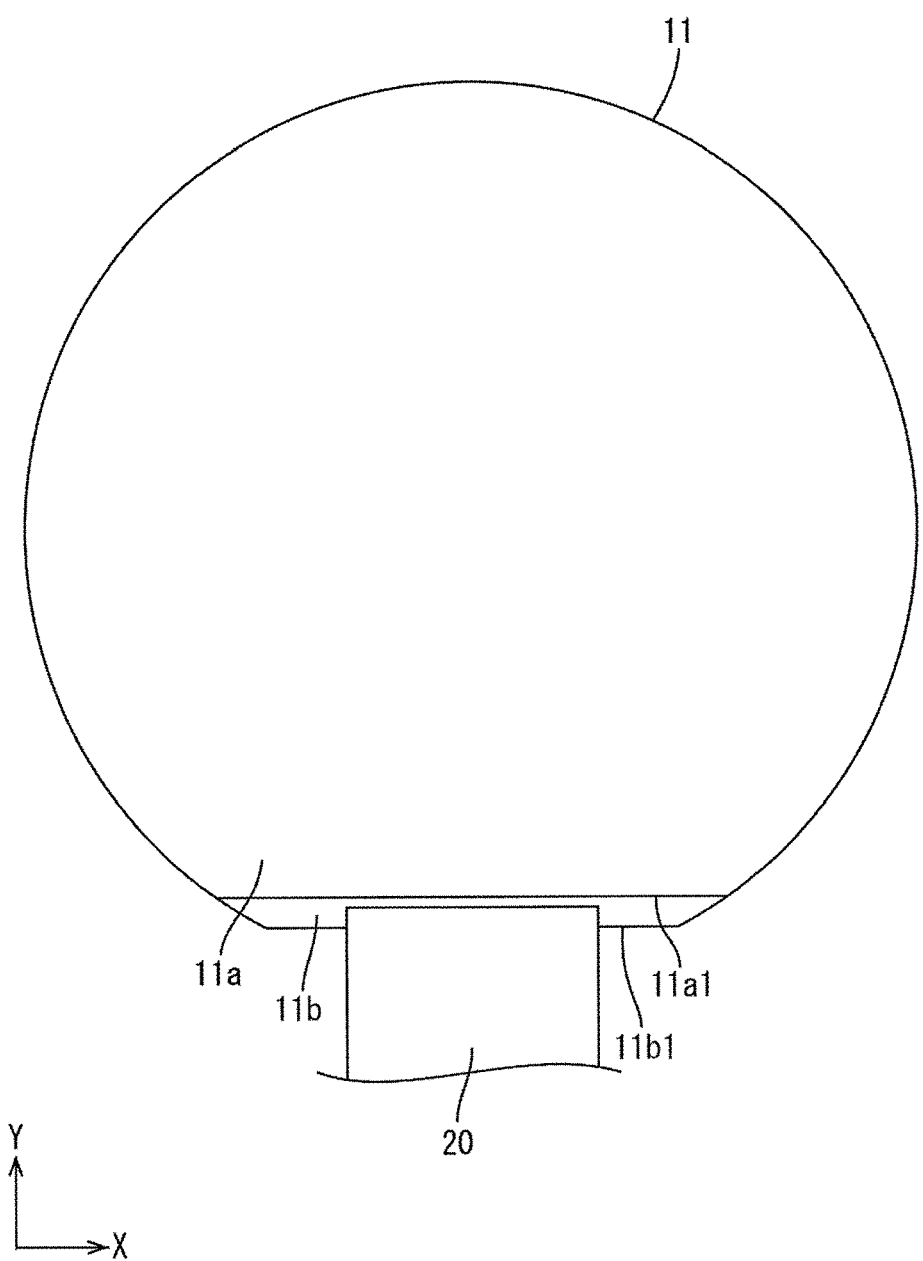
FIG. 5 is a plan view of a liquid crystal panel and a liquid crystal panel flexible circuit board.

The CF substrate 11a and the array substrate 11b of the liquid crystal panel 11, as illustrated in FIG. 1 and FIG. 5, have their respective outer peripheral edges partly linearly cut out. The CF substrate 11a has a greater cut-off width than the array substrate 11b. Accordingly, the array substrate 11b has a cut-off edge 11b1 which protrudes in a radial direction outward beyond a cut-off edge 11a1 of the CF substrate 11a. The cut-off edge 11b1 includes a terminal portion (not illustrated) for connection of a terminal portion on one end of a liquid crystal panel flexible circuit board (flexible circuit board) 20 for supplying various signals concerning display. The portions of the CF substrate 11a and the array substrate 11b that are cut out are bow-shaped. The liquid crystal panel flexible circuit board 20 includes a base member made from a synthetic resin material that is insulating and flexible (for example, a polyimide-based resin). On the base member, a number of wiring patterns (not illustrated) are formed. As illustrated in FIG. 4, the liquid crystal panel flexible circuit board 20 as a whole is folded in substantially U shape, with the one end connected to the cut-off edge 11b1 of the array substrate 11b and the other end connected to a control board (display control board) 21 disposed on the lower side of the backlight unit 12. The control board 21 outputs various signals that are transmitted via the liquid crystal panel flexible circuit board 20 to the array substrate 11b, to drive the TFT in the display region and control the display of an image.

Figure 2:
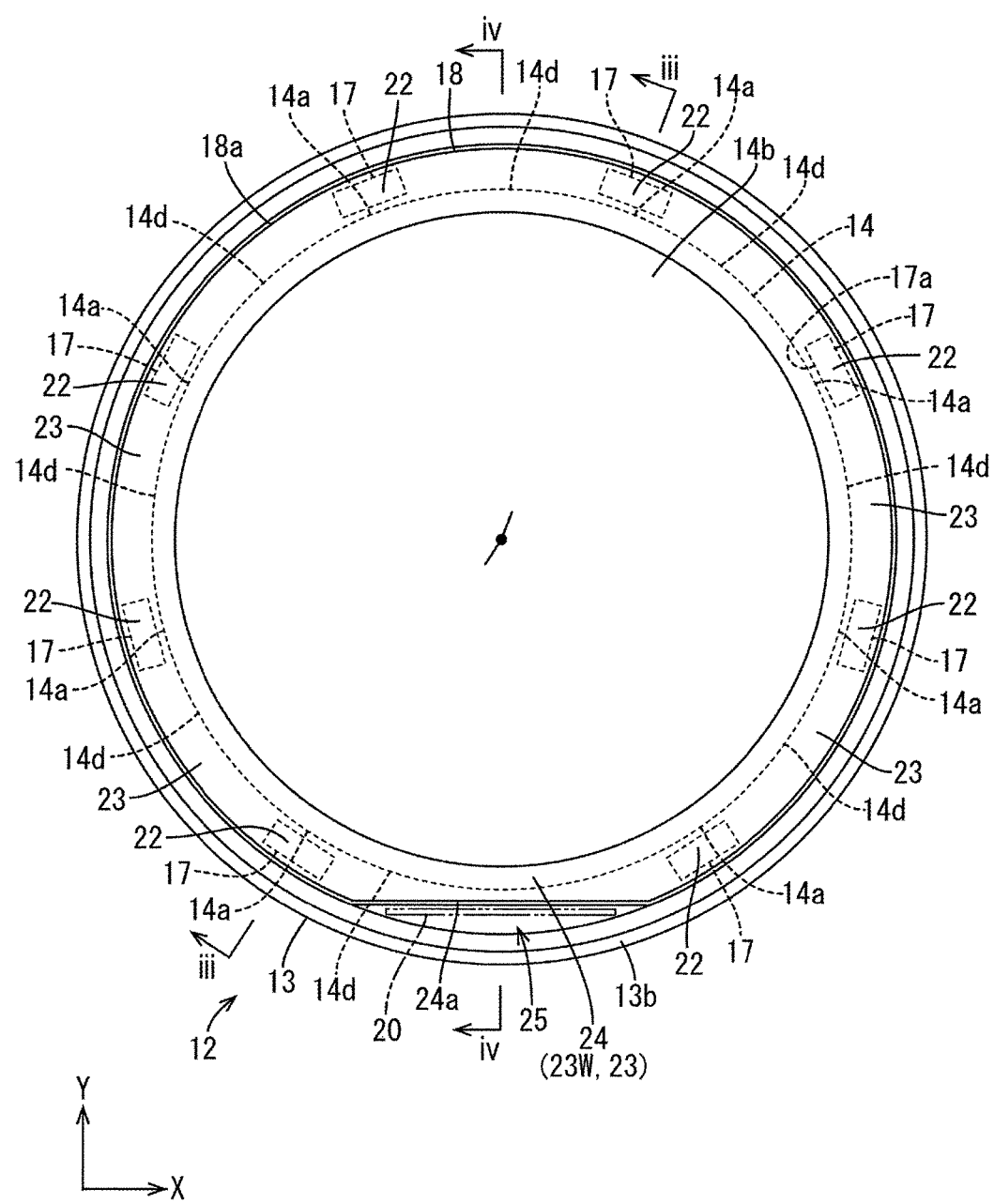
FIG. 2 is a plan view of a backlight unit provided in the liquid crystal display device.

The configuration of the backlight unit 12 will be described in detail. The backlight unit 12 as a whole is substantially circular and substantially block-shaped as viewed in plan, similarly to the liquid crystal panel 11. The backlight unit 12, as illustrated in FIG. 1 to FIG. 3, is provided with at least: a substantially box-shaped chassis (case) 13 having an opening toward the liquid crystal panel 11; light emitting diodes (LEDs) 17 as light sources; an LED substrate (light source board) 18 on which the LEDs 17 are mounted; a light guide plate 14 which is superposed on the upper side with respect to the chassis 13 and which guides light from the LEDs 17; optical sheets 15 which are superposed on the upper side (light output side) with respect to the light guide plate 14, and which provides the light output from the light guide plate 14 with an optical effect for exit toward the liquid crystal panel 11; and a reflection sheet 16 which is sandwiched between the chassis 13 and the light guide plate 14 and which reflects light toward the light guide plate 14. The backlight unit 12 converts the light from the LEDs 17 into planar light using the optical effects of the light guide plate 14, the optical sheets 15, and the reflection sheet 16, and outputs the light from the opening portion of the chassis 13 toward the liquid crystal panel 11 on the upper side. That is, the upper side with respect to the backlight unit 12 corresponds to the light output side. In the following, the constituent components of the backlight unit 12 will be described in order. The Z-axis direction indicated in the drawings corresponds to the direction normal to the sheet face of the light guide plate 14, the optical sheets 15, and the reflection sheet 16, and corresponds to the direction in which the chassis 13, the light guide plate 14, the optical sheets 15, and the reflection sheet 16 are superposed on each other.

The chassis 13 is made from synthetic resin material or metal material. As illustrated in FIG. 1 to FIG. 3, the chassis 13 has a planar shape which is substantially circular, and is substantially box-shaped (a substantially cylindrical shape with a bottom) with an opening toward the upper side. The chassis 13 accommodates the LED substrate 18, the light guide plate 14, the optical sheets 15, and the reflection sheet 16. The chassis 13 as a whole has a substantially circular shape as viewed in plan (as viewed from the Z-axis direction), similarly to the liquid crystal panel 11 and the like. The chassis 13 includes a substantially circular bottom wall portion 13a, and a sidewall portion 13b rising from the outer peripheral end of the bottom wall portion 13a toward the upper side. The bottom wall portion 13a has a sheet face which is parallel with the sheet face of each of the light guide plate 14, the optical sheets 15, the reflection sheet 16, and the liquid crystal panel 11, and supports, from the lower side, the light guide plate 14, the optical sheets 15, and the reflection sheet 16 accommodated in the chassis 13. The sidewall portion 13b is disposed to surround, from the outer peripheral side, the light guide plate 14, the optical sheets 15, the reflection sheet 16, and the LED substrate 18 (LEDs 17) accommodated in the chassis 13. Accordingly, the sidewall portion 13b as a whole is substantially ring-shaped (substantially circular frame-shaped). To a distal end of the sidewall portion 13b, a lower side face at the outer peripheral end of a panel fixing tape 19 for fixing the liquid crystal panel 11 to the backlight unit 12 is fixedly attached. The panel fixing tape 19 is a double-sided tape including adhesive faces on both sides of a base member. The panel fixing tape 19 is fixedly attached to the sidewall portion 13b and the optical sheets 15 which will be described later (specifically, a second lens sheet 15c which will be described later) to span therebetween, and also to the liquid crystal panel 11.

The LEDs 17, as illustrated in FIG. 1 to FIG. 3, are constructed of LED chips (LED elements), which are semiconductor light-emitting elements, that are encapsulated with resin material on a substrate portion fixedly attached to the sheet face of the LED substrate 18. The LEDs 17 have anode and cathode terminals, not illustrated, between which a forward-bias DC current is flowed to cause the LED chips to emit light. The LED chips mounted on the substrate portion have a single main emission wavelength, specifically for the single color of blue. The resin material in which the LED chips are encapsulated has dispersed and compounded therein fluorescent materials which, when excited by the blue light from the LED chips, emit predetermined colors of light (for example yellow, green, and red), so that the LEDs 17 as a whole emit generally white light. The LEDs 17 are of a so-called side-emitting type, with light-emitting faces 17a arranged on a side surface adjacent to the mounting face on the LED substrate 18. The LEDs 17 have a height dimension smaller than a thickness dimension of the light guide plate 14, which will be described later, and specifically may be approximately 0.4 mm, for example. The LEDs 17 have an optical axis in parallel to a direction normal to the light-emitting faces 17a. The "optical axis" herein refers to the direction of propagation of light having the highest emission strength, in the emitted light (light distribution) from the LEDs 17.

Figure 6:
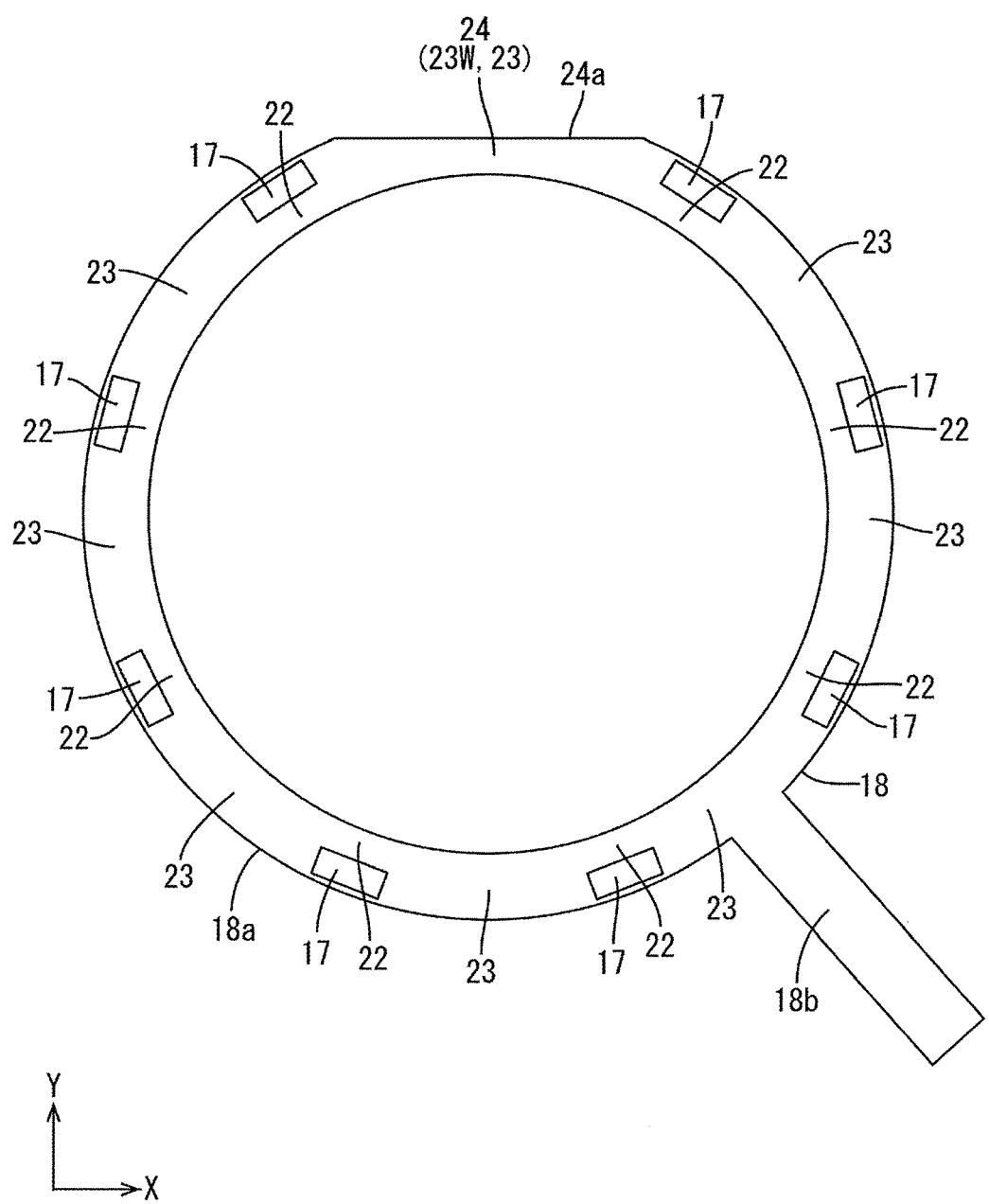
FIG. 6 is a bottom view of an LED board.

The LED substrate 18, as illustrated in FIG. 1, FIG. 3, and FIG. 6, is made from insulating material (for example, a polyimide-based resin) in the form of a flexible film (sheet). The LED substrate 18 has a sheet face in parallel with the sheet face of the bottom wall portion 13a and the like of the chassis 13, and has a substantially circular outer shape. The LED substrate 18 includes: a substrate body 18a having an endless ring-shape extending along the circumferential direction of the light guide plate 14, the optical sheets 15, and the reflection sheet 16; and a lead-out portion 18b extending in a radial direction from a part of the substrate body 18a. The endless ring-shaped substrate body 18a has an inner diameter dimension which is smaller than outer diameter dimensions of the light guide plate 14 and the reflection sheet 16, and an outer diameter dimension which is approximately equivalent to an outer diameter dimension of the reflection sheet 16. The endless ring-shaped substrate body 18a is disposed to overlap the outer peripheral end of the light guide plate 14 on the upper side. The substrate body 18a is fixedly attached to the optical sheets 15 (specifically, a diffuser sheet 15a which will be described later) that overlaps the substrate body 18a on the upper side thereof, via fixing material which is not illustrated. Examples of the fixing material include a double-sided tape and an adhesive. The substrate body 18a has a wiring portion (not illustrated) patterned thereon for feeding power to the mounted LEDs 17. The "radial direction" herein refers to a direction in which the distance from the center of the members that are circular-shaped or ring-shaped (such as the light guide plate 14 and the LED substrate 18) varies, whereas the "circumferential direction" refers to a direction in which the distance from the center does not vary.

Of the upper and lower sheet faces of the substrate body 18a of the LED substrate 18, the lower side sheet face has LEDs 17 mounted thereon, as illustrated in FIG. 3 and FIG. 6. The terminals of the LEDs 17 are soldered for mechanical and electrical connections. The LEDs 17 are arranged in a ring shape (ring-shaped and curved) on the substrate body 18*a* along the circumferential direction of the substrate body 18*a*, at intervals with respect to the circumferential direction. Specifically, on the substrate body 18*a*, a total of eight LEDs 17 are disposed at intervals with respect to the circumferential direction. Specific two of the LEDs 17 that are adjacent to each other with respect to the circumferential direction have an angular interval of approximately 66 degrees (which is approximately 1.5 times the angular interval of the other LEDs 17, the value being greater than an angular interval (45 degrees) calculated when 360 degrees is divided by the total number of the LEDs 17). The rest of the adjacent LEDs 17 has an angular interval of approximately 42 degrees (a value smaller than an angular interval (45 degrees) calculated when 360 degrees is divided by the total number of the LEDs 17). Accordingly, the LEDs 17 are arranged asymmetrically with respect to the center of the substrate body 18*a*. The light-emitting faces 17*a* of the LEDs 17 are all directed toward the center of the light guide plate 14.

The substrate body 18*a*, as illustrated in FIG. 6, is sectioned, with respect to the circumferential direction, into LED mount portions (light source mount portion) 22 in which the LEDs 17 are mounted, and LED interval portions (light source interval portion) 23 in which the LEDs 17 are not mounted and which are disposed between the LED mount portions 22 adjacent with respect to the circumferential direction. The LED mount portions 22 have a dimension with respect to the circumferential direction which is equal to a width dimension of the LEDs 17. That is, the LED mount portions 22 are the portions of the substrate body 18*a* in which the LEDs 17 are mounted with respect to the circumferential direction. The LED interval portions 23 have a dimension with respect to the circumferential direction which is equal to the interval between the LEDs 17 adjacent with respect to the circumferential direction, and which is greater than the dimension of the LED mount portions 22 with respect to the circumferential direction. That is, the LED interval portions 23 are the portions of the substrate body 18*a* in which the LEDs 17 are not mounted with respect to the circumferential direction. The substrate body 18*a* is configured such that the LED mount portions 22 and the LED interval portions 23 are alternately and repeatedly continuous with respect to the circumferential direction. The number of the LED mount portions 22 and the number of the LED interval portions 23 are each equal to the number of the LEDs 17 mounted. The wiring portion on the substrate body 18*a* is routed and formed along the circumferential direction of the substrate body 18*a* to span between the LED mount portions 22 and the LED interval portions 23. As mentioned above, the LEDs 17 include those of which the interval with respect to the circumferential direction is wider. Accordingly, the LED interval portions 23, which are provided as many as the LEDs 17, include an extended LED interval portion (extended light source interval portion) 23W with a relatively large dimension (formed area) with respect to the circumferential direction. The extended LED interval portion 23W has a dimension with respect to the circumferential direction which is approximately 1.5 times the corresponding dimension of the other LED interval portions 23, and which is greater than a width dimension of the liquid crystal panel flexible circuit board 20. On the other hand, the LED interval portions 23 other than the extended LED interval portion 23W have a dimension with respect to the circumferential direction which is smaller than the width dimension of the liquid crystal panel flexible circuit board 20. In the following, when the LED interval portions 23 are distinguished, the reference sign for the extended LED interval portion will be suffixed with W; when the LED interval portions 23 are collectively referred to and not distinguished, the reference sign will not be suffixed.

The lead-out portion 18*b*, as illustrated in FIG. 6, is continuous with the specific LED interval portion 23 of the substrate body 18*a* with respect to the circumferential direction, and extends substantially straight outward from the continuous LED interval portion 23 along the radial direction. The lead-out portion 18*b* is provided with a lead-out wiring portion (not illustrated) continuous with the wiring portion of the substrate body 18*a*. The lead-out portion 18*b* is also provided with a terminal portion (not illustrated) exposed at the distal end thereof in the extending direction, the terminal portion being continuous with the lead-out wiring portion. The lead-out portion 18*b* is led out of the backlight unit 12 through an opening portion (not illustrated) partly formed in the bottom wall portion 13*a* of the chassis 13 (see FIG. 3). The lead-out portion 18*b* passed through the opening portion is configured to be connected to an LED drive circuit, not illustrated, disposed on the lower side of the chassis 13.

The light guide plate 14, as illustrated in FIG. 1 to FIG. 3, is made of synthetic resin (for example, acrylic resin, such as PMMA), and has a substantially circular shape as viewed in plan, similarly to the bottom wall portion 13*a* of the chassis 13. The light guide plate 14 has an outer diameter dimension which is slightly smaller than the bottom wall portion 13*a* of the chassis 13. That is, the light guide plate 14 may be said to have an outer shape conforming to the ring-shaped arrangement of the LEDs 17 on the LED substrate 18. The light guide plate 14 is accommodated in the chassis 13 to be surrounded by the sidewall portion 13*b*, and is disposed directly below the liquid crystal panel 11 and the optical sheets 15. The light guide plate 14 has an outer peripheral end face which is sectioned into LED opposing portions (light source opposing portions) opposing the LEDs 17, and LED non-opposing portions (light source non-opposing portions) not opposing the LEDs 17. The LED opposing portions constitute light input faces 14*a* via which the light from the LEDs 17 directly enters. On the other hand, the LED non-opposing portions constitute non-light entry faces 14*d* via which hardly any of the light from the LEDs 17 directly enters. On the outer peripheral end face of the light guide plate 14, the light input faces 14*a* and the non-light entry faces 14*d* are disposed repeatedly and alternately with respect to the circumferential direction. The angular intervals between the light input faces 14*a* and the non-light entry faces 14*d* with respect to the circumferential direction are the same as the angular intervals between the adjacent LEDs 17 on the LED substrate 18 with respect to the circumferential direction. The light input faces 14*a* have a formed area on the outer peripheral end face of the light guide plate 14 with respect to the circumferential direction, the formed area being generally equal to the width dimension of the LEDs 17 and narrower than the corresponding formed area of the non-light entry faces 14*d*. The light guide plate 14 has a thickness dimension which is greater than the above-described height dimension of the LEDs 17. Specifically, the thickness dimension of the light guide plate 14 is, for example, on the order of 0.6 mm. In the present embodiment, while the LED non-opposing portions are described as "the non-light entry faces 14*d*", this does not mean that there is no incident light at all. Light that has leaked outward from the non-light entry faces 14d may be reflected and returned by the sidewall portion 13b, and the return light may become incident on the non-light entry faces 14d, for example.

Of the upper and lower pair of sheet faces of the light guide plate 14, the sheet face facing the upper side (liquid crystal panel 11 side), as illustrated in FIG. 3, is a light emitting face 14b via which light is emitted toward the liquid crystal panel 11. On the other hand, the sheet face of the light guide plate 14 facing the lower side (reflection sheet 16 side; bottom wall portion 13a side) is an opposite sheet face (reflection sheet-side sheet face) 14c on the opposite side from the light emitting face 14b. In this configuration, the direction in which the LEDs 17 and the light guide plate 14 are arranged and the direction in which the optical sheets 15 (liquid crystal panel 11) and the light guide plate 14 are arranged are orthogonal to each other. The light guide plate 14 has the function of introducing the light emitted from the LEDs 17 via the light input faces 14a, and causing the light to propagate therein and rise upward toward the optical sheets 15 (upper side; light emitting side) to exit via the light emitting face 14b, i.e., the upper side sheet face. On the opposite sheet face 14c of the light guide plate 14, a light reflecting pattern (not illustrated) is formed which includes a light reflecting portion for promoting the emission via the light emitting face 14b by reflecting the light in the light guide plate 14 toward the light emitting face 14b. The light reflecting portion of the light reflecting pattern includes a number of light reflecting dots having a distribution density varying in accordance with the distance from the light input faces 14a (LEDs 17). Specifically, with respect to the radial direction of the light guide plate 14, the distribution density of the light reflecting dots of the light reflecting portion is inclined to become higher with increasing distance from the light input faces 14a and lower with decreasing distance to the light input faces 14a, so that the distribution density is the highest at the center position of the light guide plate 14 and the lowest at the outer peripheral end position of the light guide plate 14. With respect to the circumferential direction of the light guide plate 14, the distribution density of the light reflecting dots becomes the highest at the center position of the non-light entry faces 14d of the light guide plate 14 (at the intermediate position of the adjacent light input faces 14a), and the lowest at the center position of the light input faces 14a (the intermediate position of the adjacent non-light entry faces 14d normal to the light-emitting faces 17a of the LEDs 17). In this way, the optical design of the light reflecting pattern is optimized, whereby the brightness uniformity of the light emitted from the light emitting face 14b of the light guide plate 14 is improved.

The optical sheets 15, as illustrated in FIG. 1 and FIG. 3, have a substantially circular shape as viewed in plan, similarly to the light guide plate 14, and have an outer diameter dimension slightly greater than the light guide plate 14. The optical sheets 15 are placed on the upper side of the light emitting face 14b of the light guide plate 14, and interposed between the liquid crystal panel 11 and the light guide plate 14. The optical sheets 15 transmit the light output from the light guide plate 14, and allow the transmitted light to exit toward the liquid crystal panel 11 while providing the transmitted light with a predetermined optical effect. The optical sheets 15 according to the present embodiment includes a total of three sheets including one diffuser sheet 15a and two lens sheets 15b, 15c (the first lens sheet 15b and the second lens sheet 15c). The diffuser sheet 15a is configured of a substantially transparent synthetic resin base member in which a number of diffusing particles for diffusing light are dispersed and compounded. The diffuser sheet 15a is laid directly over the light guide plate 14, and is disposed nearest the light guide plate 14 among the optical sheets 15.

The two lens sheets 15b, 15c, as illustrated in FIG. 1 and FIG. 3, include a number of unit lenses provided on one sheet face of the substantially transparent synthetic resin base member. Of the two lens sheets 15b, 15c, the one superposed directly over the diffuser sheet 15a is the first lens sheet 15b, and the one which is superposed directly thereover and disposed closest to the liquid crystal panel 11 is the second lens sheet 15c. In the first lens sheet 15b, a number of unit lenses extending along a first direction in parallel with the sheet face are arranged side by side along a second direction perpendicular to the first direction, in order to provide the emitted light with a light condensing effect (anisotropic light condensing effect) selectively with respect to the second direction, in which the unit lenses are arranged. In the second lens sheet 15c, a number of the unit lenses extending along the second direction in parallel with the sheet face are arranged side by side along the first direction perpendicular to the second direction, in order to provide the emitted light with a light condensing effect selectively with respect to the first direction, in which the unit lenses are arranged. In this way, the first lens sheet 15b and the second lens sheet 15c have the respective unit lenses extending and arranged in mutually perpendicular directions. To the outer peripheral end of the second lens sheet 15c, the lower side face of the panel fixing tape 19 is fixedly attached. In drawings, the X-axis direction corresponds to the extending direction of the unit lenses of the first lens sheet 15b (first direction), and the Y-axis direction corresponds to the extending direction of the unit lenses of the second lens sheet 15c (second direction). In particular, in FIG. 1, the respective unit lenses of the lens sheets 15b, 15c are indicated by the stripes in parallel with the X-axis direction or the Y-axis direction.

The reflection sheet 16, as illustrated in FIG. 1 and FIG. 3, is disposed on the lower side of the light guide plate 14 to cover the opposite sheet face 14c on the opposite side from the light emitting face 14b. The reflection sheet 16 includes a synthetic resin sheet material with a highly optically reflective white surface. Accordingly, the reflection sheet 16 can cause the light that has propagated in the light guide plate 14 and exited via the opposite sheet face 14c to rise toward the upper side (light emitting face 14b) efficiently. The reflection sheet 16 has a substantially circular shape as viewed in plan, similarly to the light guide plate 14 and the optical sheets 15, and has an outer diameter dimension greater than the light guide plate 14. The reflection sheet 16 is disposed with its major portion toward the center sandwiched between the light guide plate 14 and the bottom wall portion 13a of the chassis 13. The outer peripheral end of the reflection sheet 16 extends outward beyond the outer peripheral end face of the light guide plate 14 so that, particularly by the portion extending from the light input faces 14a on the LEDs 17 side, the light from the LEDs 17 can be efficiently reflected and caused to enter the light input faces 14a.

As described above, the LEDs 17 arranged to surround the light guide plate 14 are mounted on the substantially ring-shaped LED substrate 18 conforming to the outer shape of the light guide plate 14. Meanwhile, to the liquid crystal panel 11, one end of the liquid crystal panel flexible circuit board 20 for transmitting various signals concerning display is connected, and the other end of the liquid crystal panel flexible circuit board 20 is connected to the control board 21 disposed on the back side of the backlight unit 12. Accordingly, if the conventional configuration is adopted in which the portion of the liquid crystal panel flexible circuit board 20 between one end and the other end thereof is passed and folded outside the LEDs 17 with respect to the radial direction of the backlight unit 12, there is a problem in that the width of the frame of the backlight unit 12 is partially increased by the space for passing the liquid crystal panel flexible circuit board 20.

Accordingly, the LED interval portions 23 of the LED substrate 18 provided in the backlight unit 12 according to the present embodiment include, as illustrated in FIG. 2, FIG. 4, and FIG. 6, a cut-out LED interval portion (cut-out light source interval portion) 24 with a cut-out outer edge. Between the cut-out LED interval portion 24 and the sidewall portion 13b of the chassis 13, there is provided a liquid crystal panel flexible circuit board passing space (flexible circuit board passing space) 25 for passing the liquid crystal panel flexible circuit board 20. Of the LED substrate 18, the LED interval portions 23 have more space margin than the LED mount portions 22 because of the absence of the LEDs 17. Accordingly, by cutting out the outer edge, the liquid crystal panel flexible circuit board passing space 25 can be ensured between the LED substrate 18 and the sidewall portion 13b. The sum of the radial dimension of the cut-out LED interval portion 24 and the radial dimension of the liquid crystal panel flexible circuit board passing space 25 is substantially equal to the radial dimension of the LED interval portions 23 other than the cut-out LED interval portion 24, or the radial dimension of the LED mount portions 22. In this way, compared to if the liquid crystal panel flexible circuit board passing space is provided between the LED mount portions 22 and the sidewall portion 13b, or if the liquid crystal panel flexible circuit board passing space is provided between an LED interval portion 23 without the cut-out outer edge and the sidewall portion 13b, the localized increase in the width of the frame with respect to the circumferential direction can be prevented, and a narrow frame can be maintained along the entire circumference. In FIG. 2, the liquid crystal panel flexible circuit board 20 is indicated by dashed-and-double-dotted line.

In the present embodiment, the width dimension (dimension with respect to a direction perpendicular to the length direction) of the liquid crystal panel flexible circuit board 20, as illustrated in FIG. 2, is greater than the interval of the LEDs 17 arranged on the LED substrate 18 at equal angular intervals with respect to the circumferential direction (i.e., the dimension of the LED interval portions 23 other than the extended LED interval portion 23W with respect to the circumferential direction). The width dimension, however, is smaller than the interval of the LEDs 17 arranged at a greater angular interval, i.e., the dimension of the extended LED interval portion 23W with respect to the circumferential direction. Accordingly, in the present embodiment, of the total of eight LED interval portions 23, the extended LED interval portion 23W has its outer edge selectively cut out, so that the extended LED interval portion 23W constitutes the cut-out LED interval portion 24. This configuration is adopted because there is only one liquid crystal panel flexible circuit board 20, and the liquid crystal panel flexible circuit board 20 is configured to transmit all of various signals to be transmitted to the liquid crystal panel 11, and the width dimension of the liquid crystal panel flexible circuit board 20 has to be made greater than the interval of the LEDs 17 spaced at equal angular intervals with respect to the circumferential direction.

The cut-out LED interval portion 24, as illustrated in FIG. 2 and FIG. 6, has the outer edge linearly cut out to conform to the sheet face of the liquid crystal panel flexible circuit board 20, the cut-off portion having a bow-shape. Accordingly, the cut-out LED interval portion 24 has a radial dimension that becomes greater with decreasing distance to the adjacent LED mount portions 22 with respect to the circumferential direction, and that becomes smaller with increasing distance from the LED mount portions 22, the radial dimension being at a minimum at the center position with respect to the circumferential direction. The liquid crystal panel flexible circuit board passing space 25 provided between the cut-out LED interval portion 24 and the sidewall portion 13b of the chassis 13, as viewed in plan, has a bow-shape. The range of the cut-out in the outer edge of the cut-out LED interval portion 24 (the formed area for the liquid crystal panel flexible circuit board passing space 25 with respect to the circumferential direction), that is the length dimension of a linear cut-off edge 24a, is wider than the width dimension of the liquid crystal panel flexible circuit board 20. Accordingly, the liquid crystal panel flexible circuit board 20 can be passed through the liquid crystal panel flexible circuit board passing space 25 without folding in the width direction. The liquid crystal panel flexible circuit board 20 passed through the liquid crystal panel flexible circuit board passing space 25, as illustrated in FIG. 4, is passed through a chassis-side opening portion 26 opened in a part of the bottom wall portion 13a of the chassis 13 that overlaps the liquid crystal panel flexible circuit board passing space 25 as viewed in plan, and connected to the control board 21 on the lower side. The outer edge of the reflection sheet 16 has a reflection sheet-side cut-out portion 27 cut out to communicate with the chassis-side opening portion 26.

A manufacturing procedure for the present embodiment having the above-described structure will be described. Prior to the manufacturing of the liquid crystal display device 10, the liquid crystal panel 11 and the constituent components of the backlight unit 12 are manufactured. When the liquid crystal display device 10 is assembled, the constituent components of the backlight unit 12 are assembled first. During the assembly of the backlight unit 12, after the reflection sheet 16 and the light guide plate 14 are accommodated in the chassis 13 for the backlight unit 12, the LED substrate 18 is accommodated and then the optical sheets 15 are successively accommodated. When the reflection sheet 16 is assembled, the reflection sheet 16 is positioned relative to the chassis 13 with respect to the circumferential direction such that the reflection sheet-side cut-out portion 27 communicates with the chassis-side opening portion 26 in the bottom wall portion 13a of the chassis 13. When the LED substrate 18 is assembled, the LED substrate 18 is positioned relative to the chassis 13 with respect to the circumferential direction such that the cut-off edge 24a of the cut-out LED interval portion 24 (the wider LED interval portion 23W) is aligned with the linear portions in the open edges of the chassis-side opening portion 26 and the reflection sheet-side cut-out portion 27 (see FIG. 2 and FIG. 4). In this way, the liquid crystal panel flexible circuit board passing space 25 is formed between the cut-out LED interval portion 24 and the sidewall portion 13b of the chassis 13, the liquid crystal panel flexible circuit board passing space 25 communicating with the chassis-side opening portion 26 and the reflection sheet-side cut-out portion 27 (see FIG. 4).

After the constituent components of the backlight unit 12 are thus assembled, the liquid crystal panel 11 with the liquid crystal panel flexible circuit board 20 already connected is assembled. When the liquid crystal panel 11 is assembled, the liquid crystal panel 11 is positioned relative to the backlight unit 12 with respect to the circumferential direction such that the cut-off edges 11a1, 11b1 at the outer peripheral edges of the CF substrate 11a and array substrate 11b are aligned with the cut-off edge 24a of the cut-out LED interval portion 24. In this way, the liquid crystal panel 11 can be assembled with reference to the cut-out LED interval portion 24 as a marker. Accordingly, the assembly work can be performed easily, and the takt time can be reduced, for example, whereby an increase in production efficiency can be achieved. Then, the other end of the liquid crystal panel flexible circuit board 20 connected to the cut-off edge 11b1 of the array substrate 11b of the liquid crystal panel 11 is passed through the liquid crystal panel flexible circuit board passing space 25, as illustrated in FIG. 2 and FIG. 4. The other end is further passed through the reflection sheet-side cut-out portion 27 and the chassis-side opening portion 26 and thus led out onto the lower side of the chassis 13, and then connected to the control board 21. In this way, the various signals concerning display that are output from the control board 21 can be supplied via the liquid crystal panel flexible circuit board 20 to the liquid crystal panel 11.

When power supply to the liquid crystal display device 10 thus manufactured is turned on, the various signals concerning display that are output from the control board 21 are transmitted via the liquid crystal panel flexible circuit board 20 to the liquid crystal panel 11, whereby the driving of the liquid crystal panel 11 is controlled, and the driving of the LEDs 17 on the LED substrate 18 is controlled by an LED drive circuit substrate, not illustrated. The light emitted from the LEDs 17, disposed side by side at intervals to surround the guide plate 14 along the circumferential direction thereof, enters the light input faces 14a of the light guide plate 14, propagates in the light guide plate 14, and then exits via the light emitting face 14b. The light that has exited the light emitting face 14b is provided with predetermined optical effects through the respective optical sheets 15, applied to the liquid crystal panel 11, and thereby utilized for displaying an image. While the LED substrate 18 has a total of eight LED interval portions 23, only one of the LED interval portions 23 (extended LED interval portion 23W) includes the cut-out LED interval portion 24, and the rest of the LED interval portions 23 has no cut out formed in the outer edge thereof. In this way, the leakage light that may be produced from the cut-out LED interval portion 24 can be suppressed. Accordingly, display quality degradation that could be caused by the cut-out LED interval portion 24 can be minimized, whereby an increase in display quality can be achieved.

As described above, the liquid crystal display device (display device) 10 according to the present embodiment includes: the liquid crystal panel (display panel) 11; the liquid crystal panel flexible circuit board (flexible circuit board) 20 connected to the liquid crystal panel 11; and the backlight unit (lighting unit) 12 configured to irradiate the liquid crystal panel 11 with light. The backlight unit 12 includes at least: LEDs (light sources) 17; the light guide plate 14 which has an outer shape conforming to the outer shape of the liquid crystal panel 11, and which guides the light from the LEDs 17; the chassis (case) 13 in which the LEDs 17 and the light guide plate 14 are accommodated, and which includes the sidewall portion 13b surrounding at least the light guide plate 14 and the LEDs 17; and the LED substrate (light source board) 18 which has the outer shape conforming to the outer shape of the light guide plate 14, and on which the LEDs 17 are mounted side by side at intervals to surround the guide plate 14 along the circumferential direction thereof. The LED substrate 18 includes at least LED mount portions (light source mount portions) 22 in which the LEDs 17 are respectively mounted, and LED interval portions (light source interval portions) 23 which are disposed between the adjacent LED mount portions 22 with respect to the circumferential direction. The LED interval portions 23 include the cut-out LED interval portion 24 with the cut-out outer edge. Between the cut-out LED interval portion 24 and the sidewall portion 13b, the liquid crystal panel flexible circuit board passing space (flexible circuit board passing space) 25 is provided for passing the liquid crystal panel flexible circuit board 20.

In this way, the light emitted from the LEDs 17 mounted on the LED substrate 18 side by side at intervals to surround the guide plate 14 along the circumferential direction thereof is guided by the light guide plate 14 and then applied to the liquid crystal panel 11, and thereby utilized for displaying an image. The LED interval portions 23 of the LED substrate 18 include the cut-out LED interval portion 24 with the cut-out outer edge. Between the cut-out LED interval portion 24 and the sidewall portion 13b of the chassis 13, the liquid crystal panel flexible circuit board passing space 25 is provided to pass the liquid crystal panel flexible circuit board 20. Accordingly, compared to if the liquid crystal panel flexible circuit board passing space is provided between the LED mount portions 22 and the sidewall portion 13b, or if the liquid crystal panel flexible circuit board passing space is provided between an LED interval portion 23 having no cut-out outer edge and the sidewall portion 13b, a narrow frame can be obtained.

Some of the LED interval portions 23 include the cut-out LED interval portions 24. Accordingly, when the liquid crystal panel 11 with the liquid crystal panel flexible circuit board 20 connected thereto is installed, the liquid crystal panel flexible circuit board 20 can be positioned with respect to the circumferential direction by using as a marker the cut-out LED interval portions 24 constituting some of the LED interval portions 23. In this way, an increase in production efficiency can be achieved. Compared to if all of the LED interval portions are the cut-out LED interval portions 24, the leakage light that may result from the cut-out LED interval portion 24 can be suppressed.

The LED substrate 18 has a ring-shape. This makes it possible to arrange the LED substrate 18 to overlap the light guide plate 14 on the opposite side from the liquid crystal panel 11 or on the liquid crystal panel 11 side. In this way, the freedom of design of the backlight unit 12 and the liquid crystal display device 10 can be increased.

Second Embodiment

A second embodiment of the present invention will be described with reference to FIG. 7 or FIG. 8. In the second embodiment, a liquid crystal panel flexible circuit board 120 has a divided structure. Redundant descriptions of structures, operations, and effects similar to those of the first embodiment are omitted.

Figure 7:
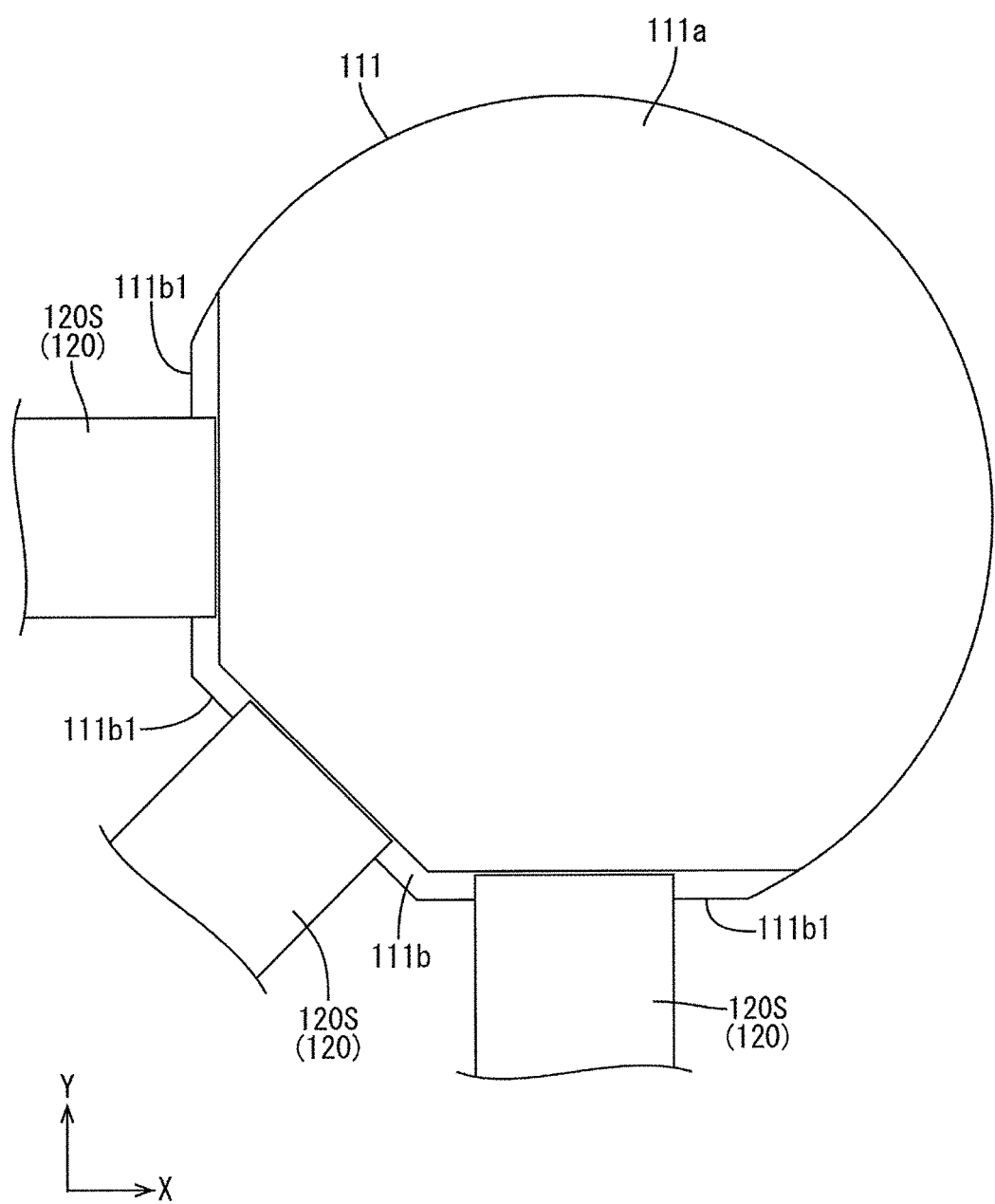
FIG. 7 is a plan view of a liquid crystal panel and a liquid crystal panel flexible circuit board according to a second embodiment of the present invention.

The liquid crystal panel flexible circuit board 120 according to the present embodiment, as illustrated in FIG. 7, is divided into three divided liquid crystal panel flexible circuit boards 120S. That is, the wiring pattern and terminal portions of the liquid crystal panel flexible circuit board 120 are distributed among the three divided liquid crystal panel flexible circuit boards 120S. In this case, the divided liquid crystal panel flexible circuit boards 120S each have a width dimension smaller than the width dimension of the liquid crystal panel flexible circuit board 20 described in the first embodiment. This is particularly preferable when the various signals transmitted by the liquid crystal panel flexible circuit board 120 are adapted for greater capacities as a result of an increase in resolution or screen size of the liquid crystal panel 111. A CF substrate 111a and an array substrate 111b of a liquid crystal panel 111 are linearly cut out at three locations that are adjacent with respect to the circumferential direction in the respective outer peripheral edges. To cut-off edges 111b1 of the array substrate 111b, one ends of the three divided liquid crystal panel flexible circuit boards 120S are respectively connected. The three divided liquid crystal panel flexible circuit boards 120S are disposed adjacent to each other with respect to the circumferential direction at the outer peripheral edge of the liquid crystal panel 111.

Figure 8:
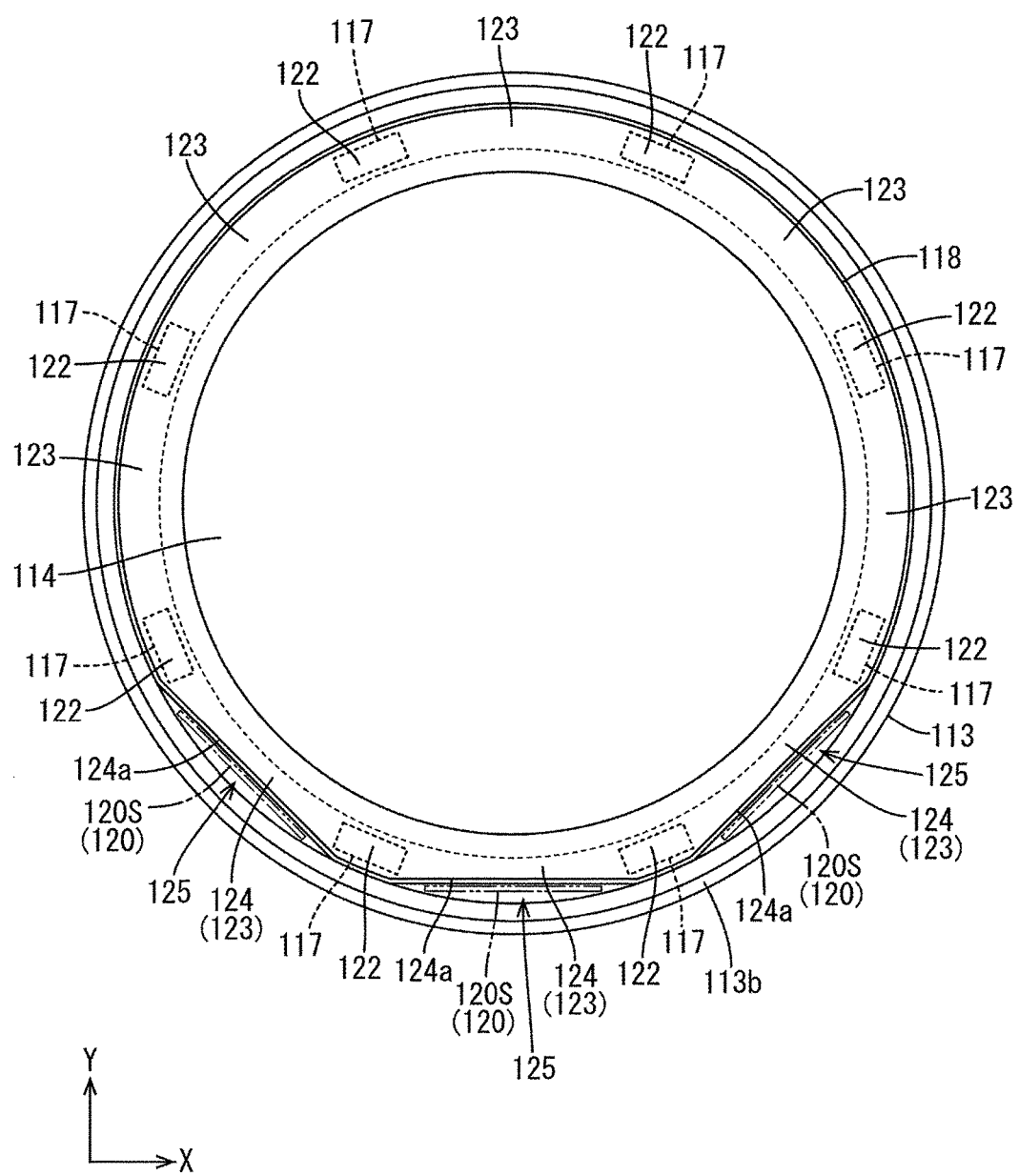
FIG. 8 is a plan view of a backlight unit.

On an LED substrate 118 according to the present embodiment, as illustrated in FIG. 8, LEDs 117 disposed side by side along the circumferential direction of the LED substrate 118 are arranged at equal angular intervals so that the adjacent LEDs 117 have the same angular interval. On the LED substrate 118, the angular interval between the adjacent LEDs 117 with respect to the circumferential direction is approximately 45 degrees (a value equal to the angular interval (45 degrees) obtained by dividing 360 degrees by the total number of the LEDs 17), which is slightly greater than the angular interval (approximately 42 degrees) between the LEDs 17 disposed at equal angular intervals on the LED substrate 18 described in the first embodiment. Accordingly, of the LED substrate 118, LED interval portions 123 disposed between the adjacent LEDs 117 with respect to the circumferential direction and LED mount portions 122 have the same dimension with respect to the circumferential direction (formed area), and the dimension is greater than the width dimension of the divided liquid crystal panel flexible circuit boards 120S. In the present embodiment, the LED interval portions 123 of the LED substrate 118 do not include the extended LED interval portion 23W described in the first embodiment. The total of eight LED interval portions 123 include the same number of the cut-out LED interval portions 124 having the cut-out outer edges as the number by which the liquid crystal panel flexible circuit board 120 is divided, i.e., three. The three cut-out LED interval portions 124 respectively have cut-off edges 124a which are arranged with respect to the circumferential direction to be aligned with the respective cut-off edges 111b1 of the array substrate 111b of the liquid crystal panel 111. The three cut-out LED interval portions 124 are disposed with respect to the circumferential direction to be adjacent to each other via the LED mount portions 122 respectively on the LED substrate 118. Between the three cut-out LED interval portions 124 and a sidewall portion 113b of the chassis 113, liquid crystal panel flexible circuit board passing spaces 125 are respectively provided. Through the three liquid crystal panel flexible circuit board passing spaces 125, the three divided liquid crystal panel flexible circuit boards 120S are respectively passed.

As described above, in the present embodiment, the liquid crystal panel flexible circuit board 120 includes divided liquid crystal panel flexible circuit boards (divided flexible circuit boards) 120S. The LED interval portions 123 include the cut-out LED interval portions 124 which are equal to or greater in number than the divided liquid crystal panel flexible circuit boards 120S. In this way, the divided liquid crystal panel flexible circuit boards 120S are respectively passed through the liquid crystal panel flexible circuit board passing spaces 125 provided between the cut-out LED interval portions 124 and the sidewall portion 113b, the cut-out LED interval portions 124 being equal to or greater in number than the divided liquid crystal panel flexible circuit boards 120S. The configuration in which the liquid crystal panel flexible circuit board 120 includes the divided liquid crystal panel flexible circuit boards 120S is preferable when the various signals transmitted by the liquid crystal panel flexible circuit board 120 are adapted for greater capacities, i.e., when the resolution or screen size of the liquid crystal panel 111 is increased, for example.

The LEDs 117 are disposed on the LED substrate 118 at equal intervals with respect to the circumferential direction. When the liquid crystal panel flexible circuit board 120 includes the divided liquid crystal panel flexible circuit boards 120S, the width of each of the divided liquid crystal panel flexible circuit boards 120S can be made narrower than the interval between the LEDs 117 disposed at equal intervals and adjacent to each other with respect to the circumferential direction, and the respective divided liquid crystal panel flexible circuit boards 120S can be passed through the liquid crystal panel flexible circuit board passing spaces 125 provided between the cut-out LED interval portions 124 and the sidewall portion 113b. Because the LEDs 117 are disposed at equal intervals with respect to the circumferential direction, the light from the LEDs 117 can be made to enter the light guide plate 114 uniformly with respect to the circumferential direction. As a result, brightness variations in the light exiting the light guide plate 114 can be prevented or reduced.

LED interval portions 123 that are adjacent via the LED mount portions 122 with respect to the circumferential direction include the cut-out LED interval portions 124. The divided liquid crystal panel flexible circuit boards 120S are connected to the liquid crystal panel 111 respectively through the liquid crystal panel flexible circuit board passing spaces 125 provided between the cut-out LED interval portions 124 and the sidewall portion 113b. In this way, the divided liquid crystal panel flexible circuit boards 120S are connected to the liquid crystal panel 111 in a concentrated manner with respect to the circumferential direction. This is preferable in terms of reducing the takt time, for example, in the step of connecting the divided liquid crystal panel flexible circuit boards 120S to the liquid crystal panel 111 during the manufacturing process.

Third Embodiment

A third embodiment of the present invention will be described with reference to FIG. 9 to FIG. 12. In the third embodiment, the configuration of the second embodiment is additionally provided with a touch panel 28 and touch panel flexible circuit boards 29. Redundant descriptions of structures, operations, and effects similar to those of the second embodiment are omitted.

Figure 9:
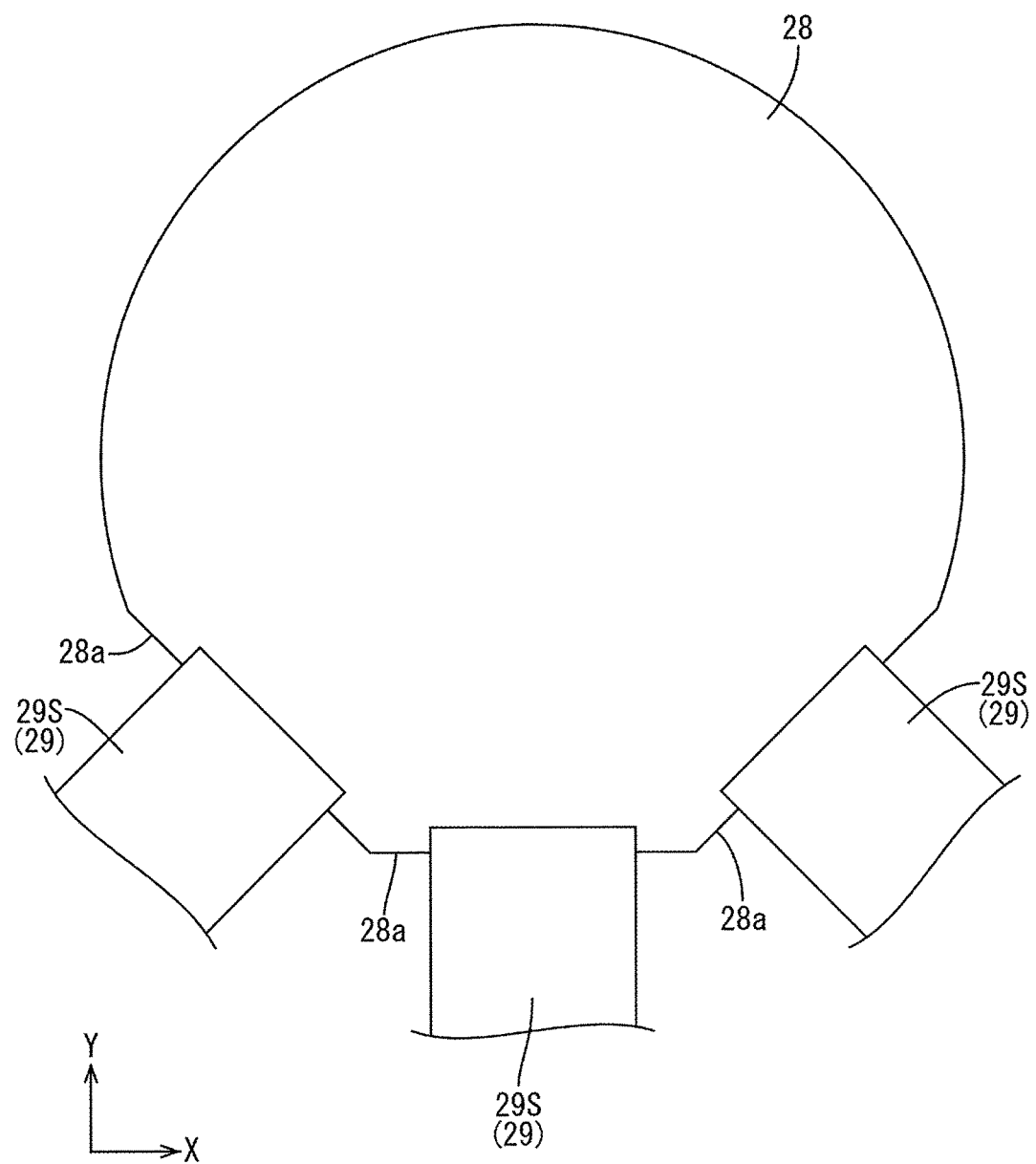
FIG. 9 is a plan view of a touch panel and a touch panel flexible circuit board according to a third embodiment of the present invention.
Figure 12:
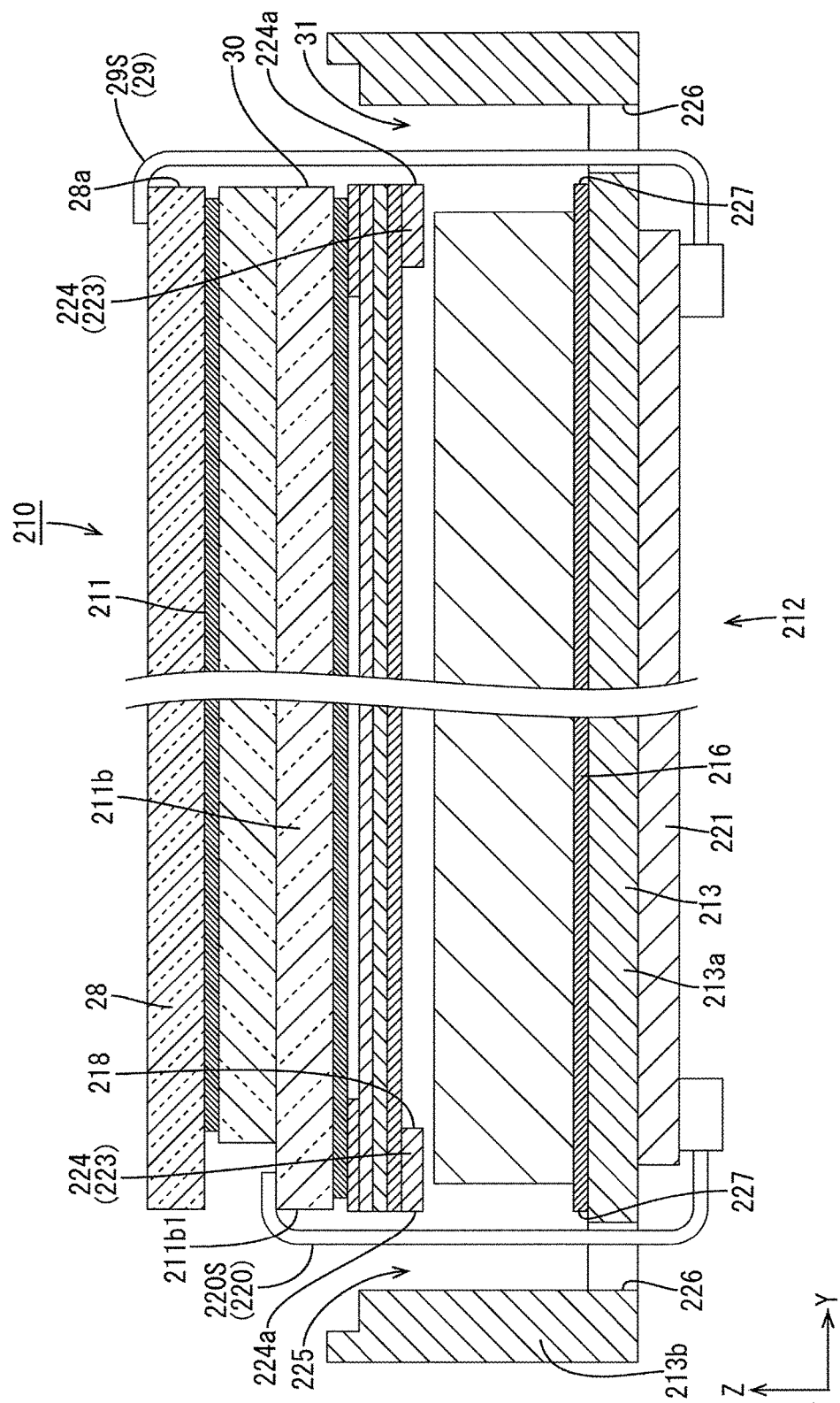
FIG. 12 is a cross sectional view taken along line xii-xii of FIG. 11.

A liquid crystal display device 210 according to the present embodiment, as illustrated in FIG. 9 and FIG. 12, is provided with a touch panel (position input device) 28 which allows a user to input position information based on an image displayed on a liquid crystal panel 211. The touch panel 28 is superposed on the upper side with respect to the liquid crystal panel 211, i.e., on the opposite side from the backlight unit 212. The touch panel 28 includes a substrate made of glass, for example, with a substantially circular shape in conformity to the outer shape of the liquid crystal panel 211, and a touch panel pattern provided on a sheet face of the substrate to detect a user input position. The touch panel pattern is of a so-called projection-type capacitive type, which is preferable for detecting multiple touches. The substrate of the touch panel 28 has its outer peripheral edge partly linearly cut out, forming linear cut-off edges 28*a*. To the cut-off edges 28*a*, one ends of touch panel flexible circuit boards 29 for transmitting various signals for position detection are connected, and the cut-off edges 28*a* are provided with terminal portions (not illustrated) for connection with terminal portions on the touch panel flexible circuit boards 29 side. The touch panel flexible circuit boards 29 include a base member of insulating and flexible synthetic resin material (for example, polyimide-based resin), with a number of wiring patterns (not illustrated) formed on the base member. The touch panel flexible circuit boards 29 are each as a whole folded in substantially U shape, with one end connected to the cut-off edges 28*a* of the touch panel 28, and the other end connected to a control board (touch panel control board) 221 disposed on the lower side of the backlight unit 212. Various signals output from the control board 221 are transmitted via the touch panel flexible circuit boards 29 to the touch panel 28 in order to implement control concerning user input position detection. In the present embodiment, the control board 221 implements both control concerning the liquid crystal panel 211 and control concerning the touch panel 28.

Figure 10:
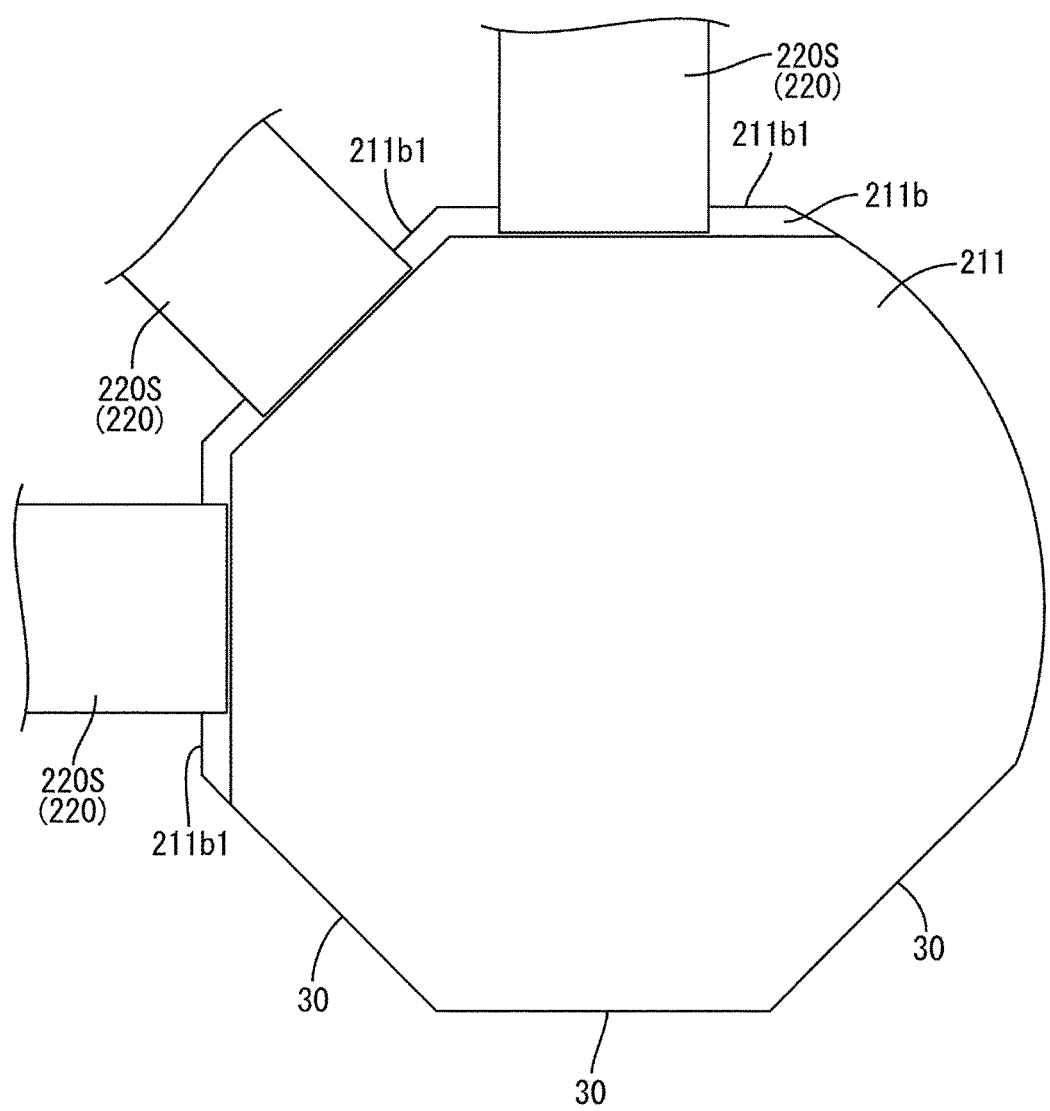
FIG. 10 is a plan view of a liquid crystal panel and a liquid crystal panel flexible circuit board.

In addition, the touch panel flexible circuit boards 29 according to the present embodiment, as illustrated in FIG. 9, include three divided touch panel flexible circuit boards 29S. That is, the wiring panels and terminal portions of the touch panel flexible circuit boards 29 are distributed among the three divided touch panel flexible circuit boards 29S. Accordingly, the divided touch panel flexible circuit boards 29S each have a width dimension equivalent to a width dimension of the divided liquid crystal panel flexible circuit boards 220S. This is particularly preferable when the various signals transmitted by the touch panel flexible circuit boards 29 are adapted for greater capacities as a result of an increase in the sensitivity or screen size of the touch panel 28. The touch panel 28 has its outer peripheral edge linearly cut out at three locations that are adjacent with respect to the circumferential direction, and one ends of the three divided touch panel flexible circuit boards 29S are respectively connected to the cut-off edges 28*a*. The three divided touch panel flexible circuit boards 29S are disposed side by side at the outer peripheral edge of the touch panel 28 to be adjacent with respect to the circumferential direction. The three divided touch panel flexible circuit boards 29S, as illustrated in FIG. 9 and FIG. 10, are arranged to be not superposed with the three divided liquid crystal panel flexible circuit boards 220S as viewed in plan. Also, the three divided touch panel flexible circuit boards 29S are disposed to be adjacent, with respect to the circumferential direction, to one of the divided liquid crystal panel flexible circuit boards 220S which is positioned at an end with respect to the circumferential direction. Accordingly, the outer peripheral edge of the liquid crystal panel 211 has cut-outs 30 formed at positions respectively superposed with the divided touch panel flexible circuit boards 29S, as illustrated in FIG. 10 and FIG. 12, to pass the divided touch panel flexible circuit boards 29S therethrough.

Figure 11:
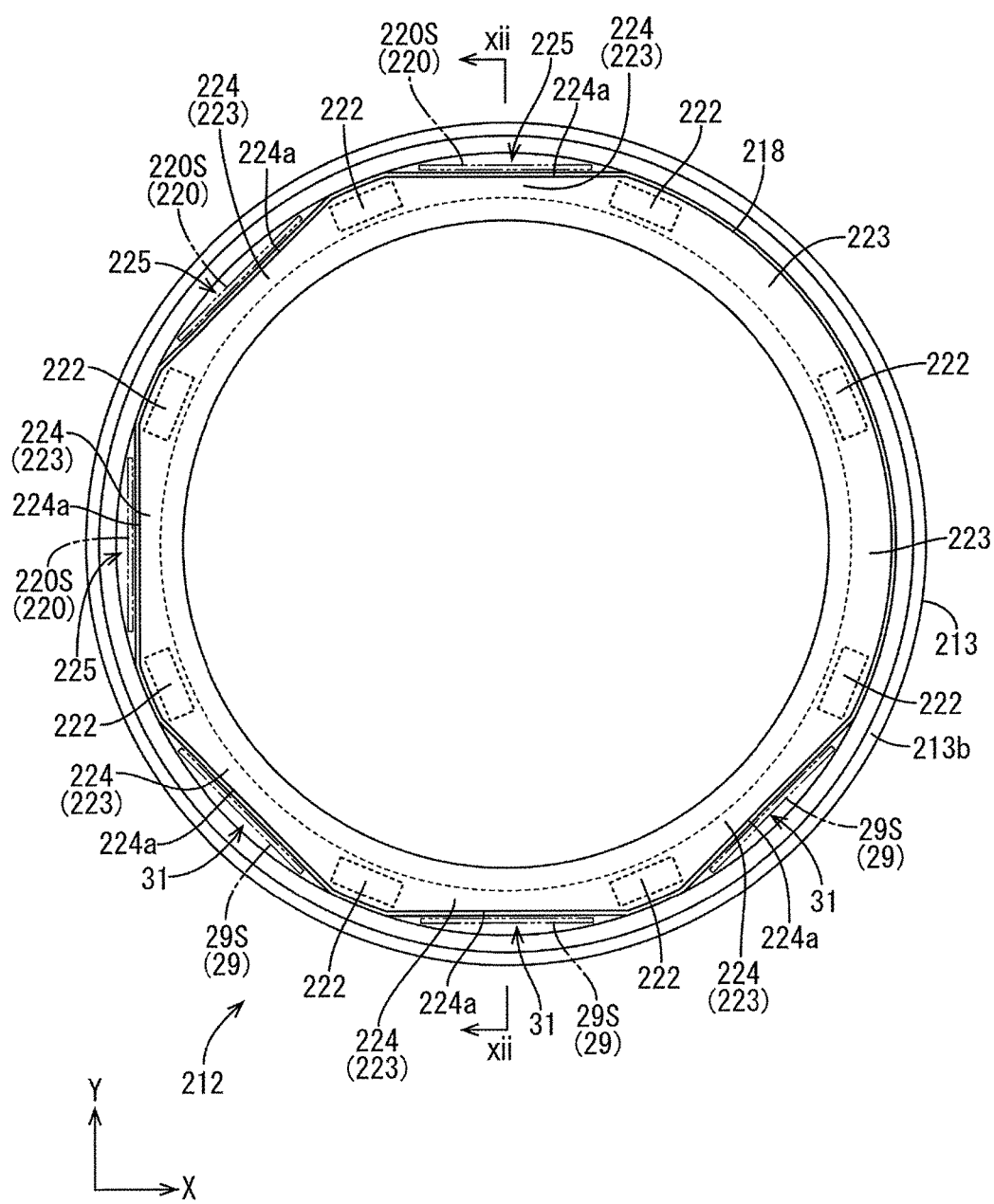
FIG. 11 is a plan view of a backlight unit.

A LED substrate 218 includes a total of eight LED interval portions 223 which, as illustrated in FIG. 11, includes as many cut-out LED interval portions 224 with the cut-out outer edges as the sum of the number of the divided liquid crystal panel flexible circuit boards 220 and the number of the divided touch panel flexible circuit boards 29, which is six. The six cut-out LED interval portions 224 are arranged with respect to the circumferential direction such that cut-off edges 224*a* of the cut-out LED interval portions 224 are aligned with cut-off edges 211*b*1 of an array substrate 211*b* of the liquid crystal panel 211 to which the three divided liquid crystal panel flexible circuit boards 220S are respectively connected, and with the cut-off edges 28*a* of the touch panel 28 to which the three divided touch panel flexible circuit boards 29S are respectively connected. The six cut-out LED interval portions 224 are disposed adjacent to each other with respect to the circumferential direction respectively via LED mount portions 222 on the LED substrate 218. Between the six cut-out LED interval portions 224 and a sidewall portion 213*b* of a chassis 213, three liquid crystal panel flexible circuit board passing spaces 225 and three touch panel flexible circuit board passing spaces 31 are provided. Through the three liquid crystal panel flexible circuit board passing spaces 225, the three divided liquid crystal panel flexible circuit boards 220S are respectively passed. Through the three touch panel flexible circuit board passing spaces 31, the three divided touch panel flexible circuit boards 29S are respectively passed. The divided touch panel flexible circuit boards 29S passed through the respective touch panel flexible circuit board passing spaces 31, as illustrated in FIG. 12, are passed through chassis-side opening portions 226 formed in portions of a bottom wall portion 213*a* of the chassis 213 that are respectively superposed with the touch panel flexible circuit board passing spaces 31 as viewed in plan, and connected to the control board 221 on the lower side. A reflection sheet 216 has an outer edge in which reflection sheet-side opening portions 227 communicating with the chassis-side opening portions 226 are cut out.

As described above, the present embodiment is provided with the touch panel 28 with the outer shape conforming to the outer shape of the liquid crystal panel 211, and the touch panel flexible circuit boards 29 connected to the touch panel 28. The cut-out LED interval portions 224 include those that have the touch panel flexible circuit board passing spaces 31 provided between the cut-out LED interval portions 224 and the sidewall portion 213*b* to pass the touch panel flexible circuit boards 29. In this way, the touch panel flexible circuit boards 29 connected to the touch panel 28 are passed through the touch panel flexible circuit board passing spaces 31 provided between the cut-out LED interval portions 224 and the sidewall portion 213*b* of the chassis 213. Accordingly, compared with if the touch panel flexible circuit board passing spaces are provided between the LED mount portions 222 and the sidewall portion 213*b*, or if the touch panel flexible circuit board passing spaces are provided between the LED interval portions 223 without the cut-out outer edge and the sidewall portion 213*b*, a narrow frame can be obtained.

The touch panel flexible circuit boards 29 include divided touch panel flexible circuit boards 29S, and the LED interval portions 223 include the cut-out LED interval portions 224 greater in number than the divided touch panel flexible circuit boards 29S. In this way, the liquid crystal panel flexible circuit boards 220 and the divided touch panel flexible circuit boards 29S are respectively passed through the liquid crystal panel flexible circuit board passing spaces 225 and the touch panel flexible circuit board passing spaces 31 provided between the cut-out LED interval portions 224 greater in number than the divided touch panel flexible circuit boards 29S and the sidewall portion 213*b*. The configuration in which the touch panel flexible circuit boards 29 include the divided touch panel flexible circuit boards 29S is preferable when the various signal transmitted by the touch panel flexible circuit boards 29 are adapted for greater capacities, i.e., when the sensitivity or screen size of the touch panel 28 are increased, for example.

LED interval portions 223 that are adjacent via the LED mount portions 222 with respect to the circumferential direction include the cut-out LED interval portions 224. The divided touch panel flexible circuit boards 29S are connected to the touch panel 28 respectively through the touch panel flexible circuit board passing spaces 31 provided between the cut-out LED interval portions 224 and the sidewall portion 213b. In this way, the divided touch panel flexible circuit boards 29S are connected to the touch panel 28 in a concentrated manner with respect to the circumferential direction. Accordingly, the configuration is preferable in terms of reducing the takt time concerning the step of connecting the divided touch panel flexible circuit boards 29S to the touch panel 28, for example, during the manufacturing process.

Fourth Embodiment

A fourth embodiment of the present invention will be described with reference to FIG. 13 or FIG. 14. In the fourth embodiment, the configuration of an LED substrate 318 is modified from the second embodiment. Redundant descriptions of structures, operations, and effects similar to those of the second embodiment are omitted.

Figure 13:
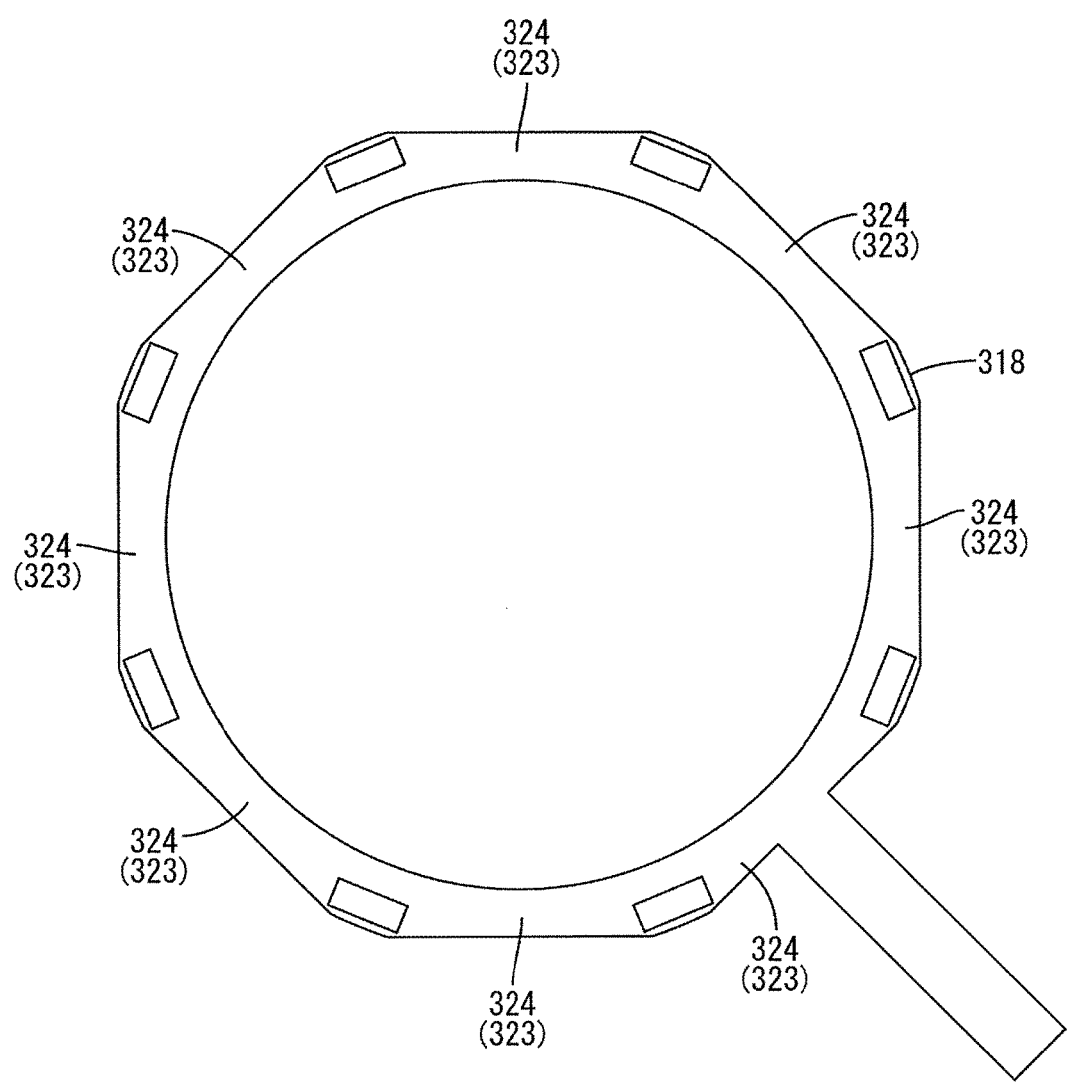
FIG. 13 is a bottom view of an LED board according to a fourth embodiment of the present invention.
Figure 14:
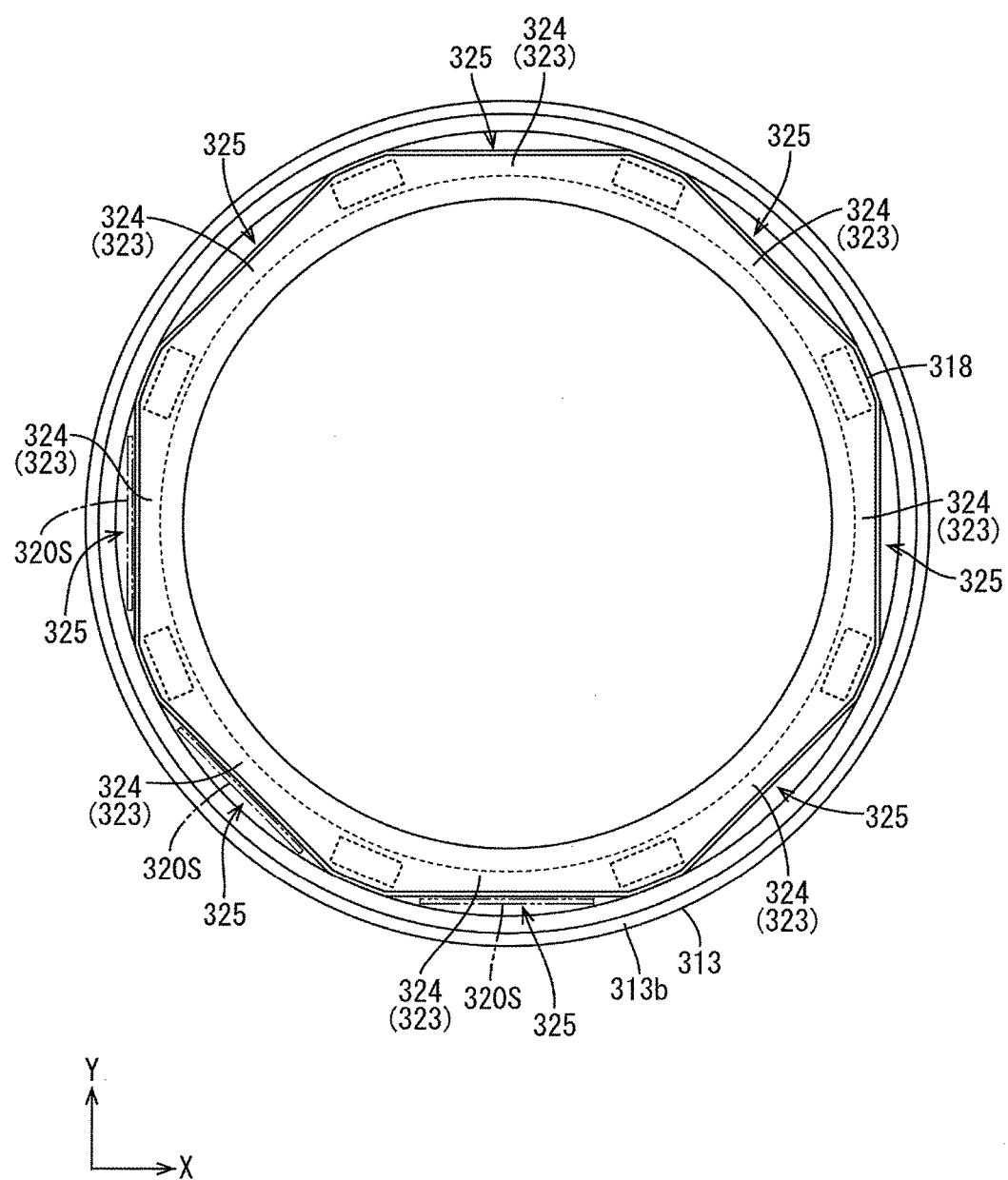
FIG. 14 is a plan view of a backlight unit.

The LED substrate 318 according to the present embodiment, as illustrated in FIG. 13, has the outer edge which is cut out in all of LED interval portions 323. That is, all of the LED interval portions 323 include cut-out LED interval portions 324. Accordingly, in the state in which an LED substrate 318 is accommodated in a chassis 313, as illustrated in FIG. 14, liquid crystal panel flexible circuit board passing spaces 325 are provided between the respective cut-out LED interval portions 324 and a sidewall portion 313b, where the number of the liquid crystal panel flexible circuit board passing spaces 325 is equal to the number (8) of the LED interval portions 323. Through any of the total of eight liquid crystal panel flexible circuit board passing spaces 325, the divided liquid crystal panel flexible circuit boards 320S can be passed through. Accordingly, when the LED substrate 318 is accommodated in the chassis 313, any of the eight cut-out LED interval portions 324 may be positioned with the chassis-side opening portions and the reflection sheet-side cut-out portions (neither of which are illustrated) with respect to the circumferential direction. In this way, compared with the second embodiment, the freedom of arrangement with respect to the circumferential direction is increased when the LED substrate 318 is assembled to the chassis 313, whereby an increase in production efficiency can be achieved.

As described above, according to the present embodiment, the LED interval portions 323 all include the cut-out LED interval portions 324. In this way, because the LED interval portions 323 are all cut-out LED interval portions 324, when the LED substrate 318 is installed, the freedom of arrangement of the LED substrate 318 with respect to the circumferential direction is increased. Accordingly, an increase in production efficiency can be achieved.

Fifth Embodiment

A fifth embodiment of the present invention will be described with reference to FIG. 15. In the fifth embodiment, the configuration of the first embodiment is additionally provided with positioning portions 32 on a sidewall portion 413b of a chassis 413. Redundant descriptions of structures, operations, and effects similar to those of the first embodiment are omitted.

Figure 15:
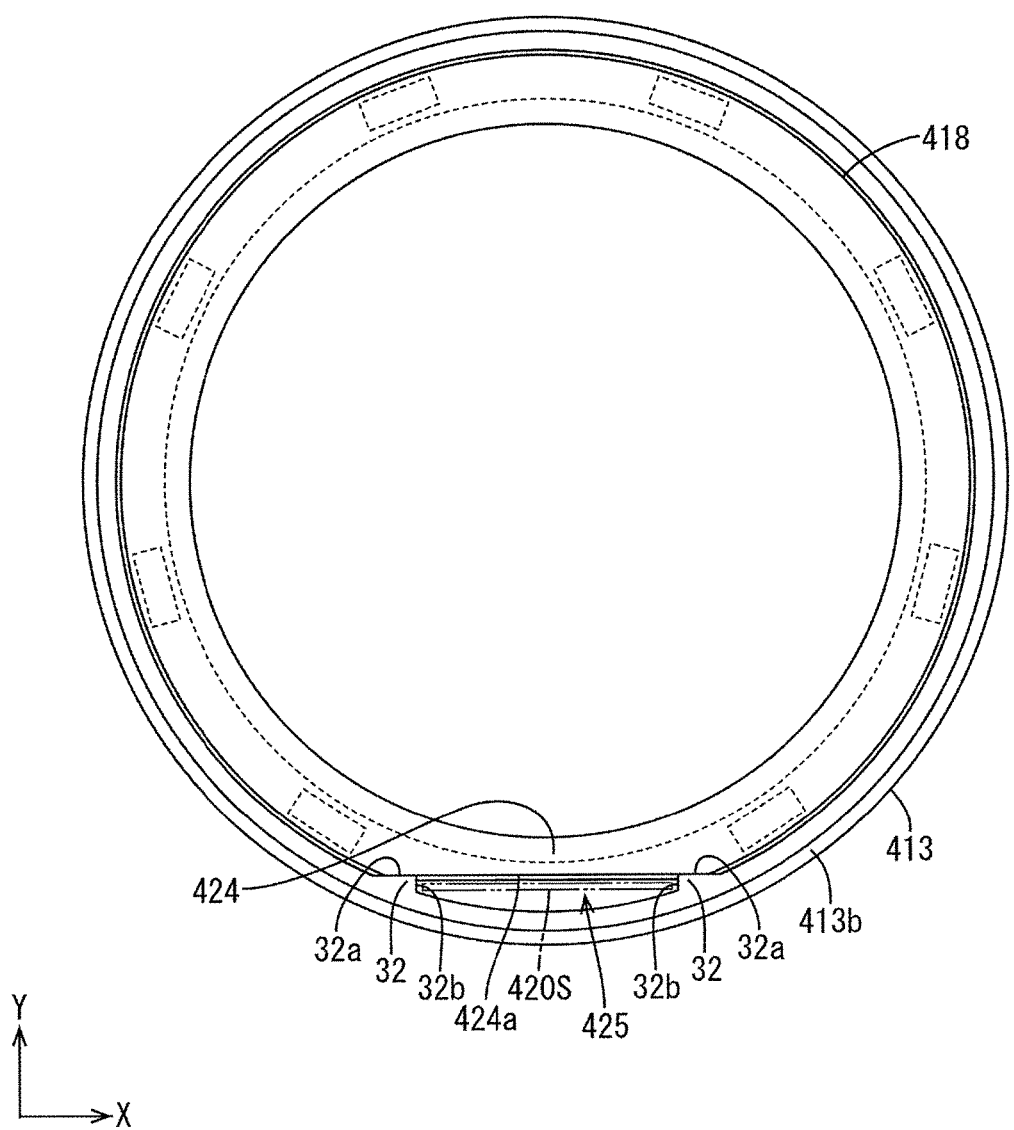
FIG. 15 is a plan view of a backlight unit according to a fifth embodiment of the present invention.

In the present embodiment, as illustrated in FIG. 15, the sidewall portion 413b of the chassis 413 includes the positioning portions 32 at portions facing a liquid crystal panel flexible circuit board passing space 425, the positioning portions 32 being configured to respectively abut on the ends of a liquid crystal panel flexible circuit board 420 with respect to the circumferential direction. The positioning portions 32 are disposed in a pair at the ends with respect to the circumferential direction where the sidewall portion 413b faces the liquid crystal panel flexible circuit board passing space 425. The positioning portions 32 are provided to protrude inward from an inner wall surface of the sidewall portion 413b with respect to a radial direction. The positioning portions 32, as viewed in plan, have a substantially right-triangle shape. Of the right-triangle, the hypotenuse is continuous with the inner wall surface of the sidewall portion 413b; one sides 32a across the right angle are in parallel with a cut-off edge 424a (a sheet face of the liquid crystal panel flexible circuit board 420) of a cut-out LED interval portion 424 of an LED substrate 418; and the other sides 32b are perpendicular to the cut-off edge 424a. The other sides 32b of the positioning portions 32 are abutted on the ends of the liquid crystal panel flexible circuit board 420 with respect to the width direction thereof, the liquid crystal panel flexible circuit board 420 being passed through the liquid crystal panel flexible circuit board passing space 425. Accordingly, the liquid crystal panel flexible circuit board 420 can be positioned with respect to the width direction. In addition, the one sides 32a of the positioning portions 32 are abutted against the cut-off edge 424a of the cut-out LED interval portion 424 of the LED substrate 418, so that the LED substrate 418 can be positioned with respect to the circumferential direction. In this way, the LED substrate 418 having an endless ring-shape can be prevented from rotating.

As described above, according to the present embodiment, the sidewall portion 413b includes, in the portion facing the liquid crystal panel flexible circuit board passing space 425, the positioning portions 32 configured to respectively abut on the ends of the liquid crystal panel flexible circuit board 420 with respect to the circumferential direction. In this way, the liquid crystal panel flexible circuit board 420 can be positioned by the positioning portions 32 with respect to the circumferential direction, whereby the positional displacement of the liquid crystal panel flexible circuit board 420 with respect to the circumferential direction can be regulated.

The LED substrate 418 has a circular outer shape, and the positioning portions 32 respectively abut on the ends of the cut-out LED interval portion 424 with respect to the circumferential direction. In this way, the LED substrate 418 including the cut-out LED interval portion 424 is positioned by the positioning portions 32 with respect to the circumferential direction, whereby the circular LED substrate 418 can be prevented from rotating.

Sixth Embodiment

A sixth embodiment of the present invention will be described with reference to FIG. 16 or FIG. 17. In the sixth embodiment, the configuration and arrangement of an LED substrate 518 are modified from the first embodiment. Redundant descriptions of structures, operations, and effects similar to those of the first embodiment are omitted.

Figure 16:
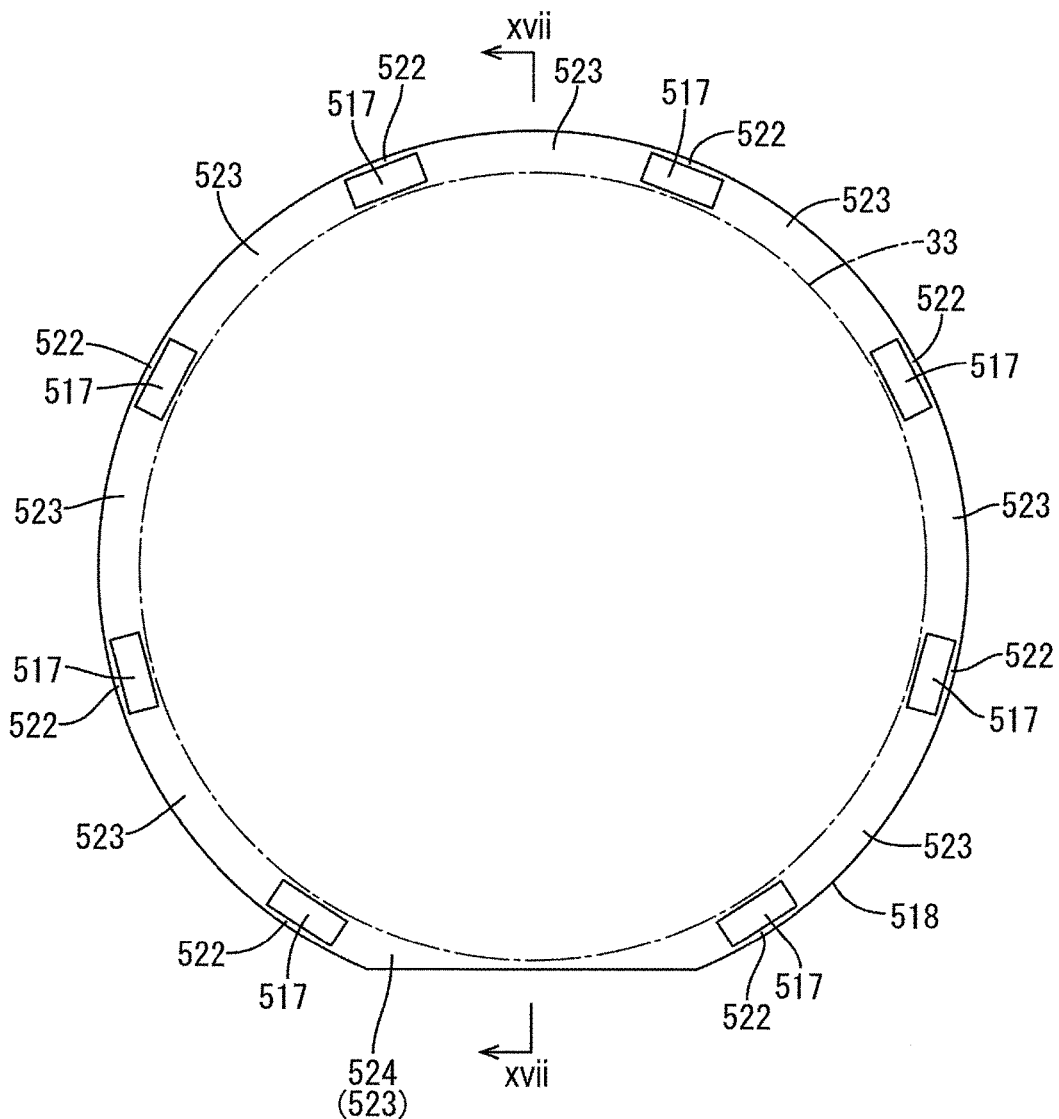
FIG. 16 is a bottom view of an LED board according to a sixth embodiment of the present invention.
Figure 17:
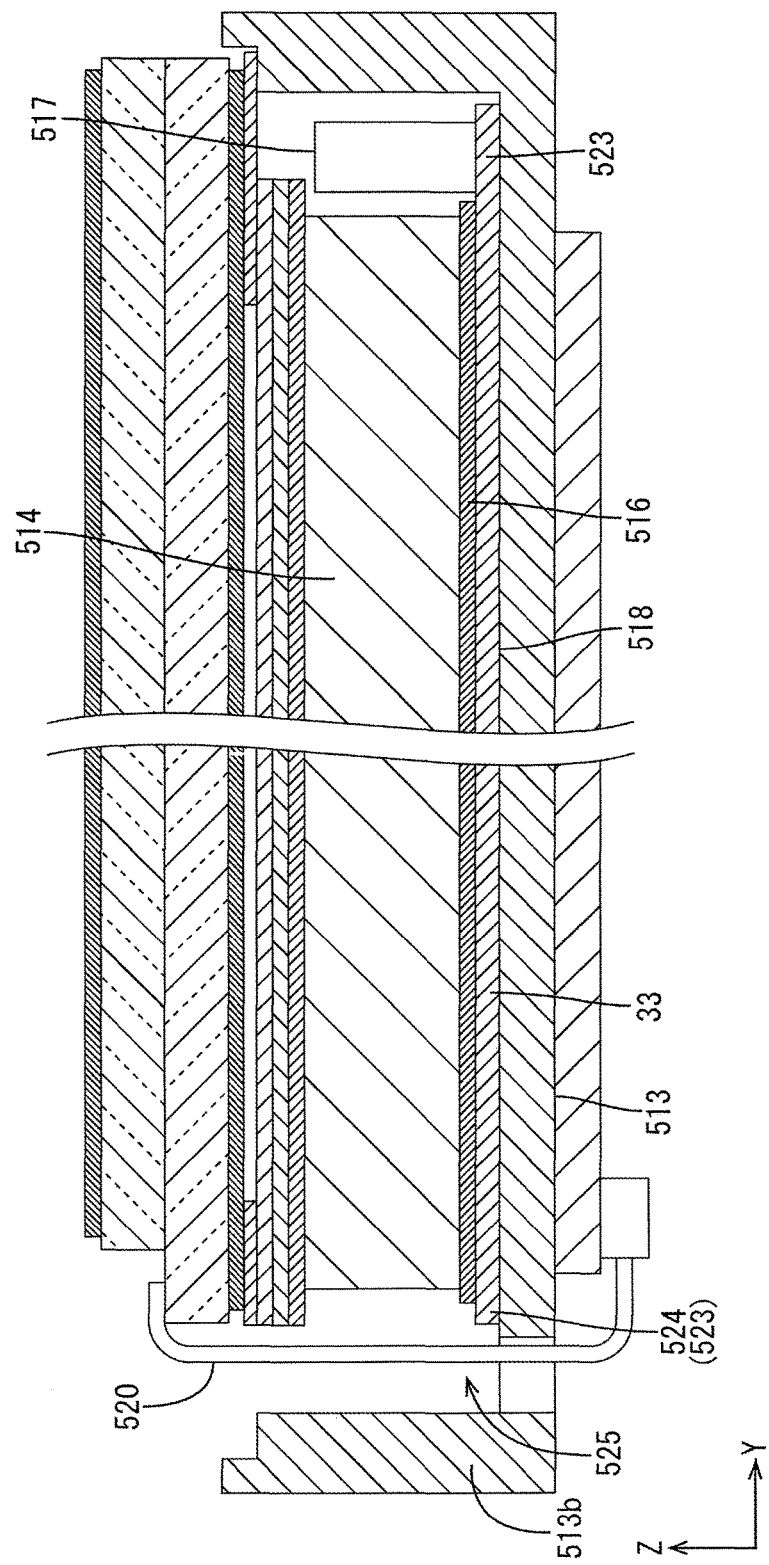
FIG. 17 is a cross sectional view of a backlight unit taken along line xvii-xvii of FIG. 16.

The LED substrate 518 according to the present embodiment, as illustrated in FIG. 16 and FIG. 17, is disposed to lie on the lower side with respect to a light guide plate 514 and a reflection sheet 516. Accordingly, LEDs 517 are mounted on the upper side sheet face of the LED substrate 518. The LED substrate 518 as a whole has a substantially circular shape as viewed in plan, and is disposed with the central portion being superposed with the light guide plate 514 and the reflection sheet 516 as viewed in plan. The central portion of the LED substrate 518 includes a superposed portion 33 with respect to the light guide plate 514 and the reflection sheet 516, and has a substantially circular planar shape. In FIG. 16, the area in which the superposed portion 33 is formed is indicated by dashed-and-dotted ling. Of the LED substrate 518, the outer peripheral portion surrounding the superposed portion 33 has a substantially ring-shape, and is sectioned, with respect to the circumferential direction, into LED mount portions 522 in which the LEDs 517 are mounted, and LED interval portions 523 in which the LEDs 517 are not mounted and which are disposed between adjacent LED mount portions 522. The LED interval portions 523 constituting the outer peripheral portion of the LED substrate 518 include a cut-out LED interval portion 524 of which the outer peripheral edge is partly linearly cut out. Between the cut-out LED interval portion 524 and a sidewall portion 513*b* of a chassis 513, a liquid crystal panel flexible circuit board passing space 525 is provided for passing a liquid crystal panel flexible circuit board 520 therethrough. The reflection sheet 516 according to the present embodiment has an outer diameter dimension smaller than that of the first embodiment to avoid interference with the LEDs 517, and the reflection sheet-side cut-out portion of the first embodiment is omitted.

Other Embodiments

The present invention is not limited to the above embodiments explained in the above description and described with reference to the drawings. The following embodiments may be included in the technical scope of the present invention, for example.

(1) In the first, fifth, and sixth embodiments, the extended LED interval portion of the LED interval portions includes the cut-out LED interval portion. However, an LED interval portion which is not an extended LED interval portion (non-extended light source interval portion) may include a cut-out LED interval portion.

(2) In the first, fifth, and sixth embodiments, the angular intervals between the LEDs that are adjacent with respect to the circumferential direction on the LED substrate are not configured to be all equal by way of example. However, if, for example, the dimension of the LED interval portions with respect to the circumferential direction is set greater than the width dimension of the liquid crystal panel flexible circuit board, the angular intervals between the LEDs that are adjacent with respect to the circumferential direction may be made all equal.

(3) In the second to fourth embodiments, the liquid crystal panel flexible circuit board is divided into the three divided liquid crystal panel flexible circuit boards by way of example. However, the specific number by which the liquid crystal panel flexible circuit board is divided may be modified to 2 or 4 or more.

(4) In the second to fourth embodiments, divided liquid crystal panel flexible circuit boards are respectively passed through the liquid crystal panel flexible circuit board passing spaces provided between the cut-out LED interval portions that are adjacent via an LED mount portion with respect to the circumferential direction and the sidewall portion. However, it is also possible to adopt a configuration in which the divided liquid crystal panel flexible circuit boards are respectively passed through liquid crystal panel flexible circuit board passing spaces provided between the cut-out LED interval portions that are adjacent via LED mount portions with respect to the circumferential direction and the sidewall portion.

(5) In the third embodiment, the touch panel flexible circuit board is divided into three divided touch panel flexible circuit boards by way of example. However, the specific number by which the touch panel flexible circuit board is divided may be modified to 2 or 4 or more.

(6) In the third embodiment, the touch panel flexible circuit board includes divided touch panel flexible circuit boards. However, the present invention is also applicable to a configuration in which a single touch panel flexible circuit board that is not divided is used. In this case, the panel flexible circuit board connected to the liquid crystal panel may have a divided structure and include divided panel flexible circuit boards, or may be a single panel flexible circuit board that is not divided.

(7) In the third embodiment, divided touch panel flexible circuit boards are respectively passed through the touch panel flexible circuit board passing spaces provided between the cut-out LED interval portions that are adjacent via an LED mount portion with respect to the circumferential direction and the sidewall portion. However, it is also possible to adopt a configuration in which divided touch panel flexible circuit boards are respectively passed through the touch panel flexible circuit board passing spaces provided between the cut-out LED interval portions that are adjacent via LED mount portions with respect to the circumferential direction and the sidewall portion.

(8) In the fourth embodiment, all of the LED interval portions include the cut-out LED interval portions, and liquid crystal panel flexible circuit board passing spaces equal in number to the LED interval portions are formed between the cut-out LED interval portions and the sidewall portion, where the liquid crystal panel flexible circuit boards are passed through three of the liquid crystal panel flexible circuit board passing spaces. However, it is also possible to combine the configuration in which, as in the first embodiment, a single liquid crystal panel flexible circuit board is provided. It is also possible to combine the configuration described in the third embodiment with the fourth embodiment. It is also possible to combine the configurations described in the fifth or sixth embodiment with the fourth embodiment.

(9) In the fifth embodiment, the positioning portions are abutted on both the liquid crystal panel flexible circuit board and the cut-out LED interval portion of the LED substrate. However, it is also possible to adopt a configuration in which the positioning portion is abutted on only one of the liquid crystal panel flexible circuit board and the cut-out LED interval portion of the LED substrate.

(10) It is also possible to combine the technical matters described in the fifth embodiment with the configuration of the second, third, or sixth embodiment.

(11) It is also possible to combine the technical matter described in the sixth embodiment with the configuration described in the second or third embodiment.

(12) Other than the above embodiments, the number of LEDs mounted on the LED substrate, and the numerical value of the angular interval between LEDs adjacent with respect to the circumferential direction, for example, may be modified as appropriate. The greater the number of LEDs mounted on the LED substrate, the smaller the angular interval between the LEDs adjacent with respect to the circumferential direction, and the narrower the dimension of the LED interval portion with respect to the circumferential direction tend to become. Accordingly, in these cases, it may be preferable to adopt the structure in which, as in the second to fourth embodiments, the liquid crystal panel flexible circuit board and/or the touch panel flexible circuit board are divided. When such configuration is adopted, it may be preferable to increase the number by which the liquid crystal panel flexible circuit board or the touch panel flexible circuit board is divided as the number of LEDs mounted increases.

(13) Other than the above embodiments, instead of all of the LED interval portions provided on the LED substrate being the cut-out LED interval portions, LED interval portions may include the cut-out LED interval portions, where the number of the cut-out LED interval portions is made greater than the number of the divided liquid crystal panel flexible circuit boards. Furthermore, it is also possible to make the number of the cut-out LED interval portions greater than the sum of the number of the divided liquid crystal panel flexible circuit boards and the number of the divided touch panel flexible circuit boards.

(14) In the foregoing embodiments, the liquid crystal panel, the light guide plate and the like have a substantially circular shape, and the LED substrate has a substantially ring-shape conforming to the substantially circular outer shape. For example, it is also possible to adopt a configuration in which the liquid crystal panel, the light guide plate and the like have a substantially rectangular shape, and the LED substrate has a substantially angular ring-shape conforming to the substantially rectangular outer shape.

(15) In the foregoing embodiments, the LED substrate is fixedly attached to an optical sheet (diffuser sheet). However, it is also possible to not fixedly attach the LED substrate to the optical sheet.

(16) In the foregoing embodiments, the LEDs are side-emitting LEDs by way of example. It is also possible to use top-emitting LEDs.

(17) In the foregoing embodiments, the LED substrate includes a film form base member by way of example. However, it is also possible to adopt a configuration in which the LED substrate base member has a sheet shape with a certain thickness.

(18) In the foregoing embodiments, LEDs are used as light sources by way of example. However, an organic EL and the like may be used as a light source.

(19) In the foregoing embodiments, the color filters of the liquid crystal panel have the colored portions of the three colors of R, G, and B by way of example. It is also possible to provide the colored portions with four or more colors.

(20) Other than the foregoing embodiments, the present invention is also applicable to a liquid crystal display device equipped with a parallax barrier panel, a cover glass and the like.

(21) In the foregoing embodiments, a transmitting liquid crystal display device has been described by way of example. However, the present invention is also applicable to a semi-transmitting liquid crystal display device.

(22) In the foregoing embodiments, TFTs are used as the switching elements of the liquid crystal display device. However, the present invention is also applicable to a liquid crystal display device using switching elements other than TFT (for example, thin-film diode (TFD)). The present invention is also applicable to not just a liquid crystal display device for color display but also a liquid crystal display device for black and white display.

(23) In the foregoing embodiments, the pixel electrodes are disposed on the array substrate side of the liquid crystal panel, and the counter electrodes are disposed on the CF substrate side. However, it is also possible to use a liquid crystal panel in which the pixel electrodes and the counter electrodes are both disposed on the array substrate side. Such liquid crystal panel may preferably be of In-Sheet face Switching (IPS) mode or Fringe Field Switching (FFS) mode.

(24) In the foregoing embodiments, a liquid crystal panel is used as the display panel. It is also possible to use a Micro Electro Mechanical Systems (MEMS) display panel, for example, in which light from a backlight unit is utilized to display an image. The MEMS display panel has a number of fine mechanical shutters forming display pixels two-dimensionally arranged in a matrix. The opening and closing of the mechanical shutters are individually controlled to adjust the amount of transmitted light of the light from the backlight unit on a display pixel by pixel basis, whereby a predetermined grayscale image can be displayed.

EXPLANATION OF SYMBOLS 10, 210: Liquid crystal display device (Display device)
11, 111, 211: Liquid crystal panel (Display panel)
12, 212: Backlight device (Illumination device)
13, 113, 213, 313, 413, 513: Chassis (Housing)
13b, 113b, 213b, 313b, 413b, 513b: Side wall portion
14, 114, 514: Light guide plate
17, 117, 217, 517: LED (Light source)
18, 118, 218, 318, 418, 518: LED substrate (Light source substrate)
20, 120, 220, 220, 420, 520: Liquid crystal panel flexible circuit board (Flexible substrate)
22, 122, 222: LED mount portion (Light source mount portion)
23, 123, 223, 323, 523: LED interval portion (Light source interval portion)
24, 124, 224, 324, 424, 524: Cut-out LED interval portion (Cut-out light source interval portion)
25, 125, 225, 325, 425, 525: Liquid crystal panel flexible circuit board passing space (Flexible substrate passing space)
28: Touch panel
29: Touch panel flexible circuit board
29S: Divided touch panel flexible circuit board
31: Touch panel flexible circuit board passing space
32: Positioning portion
120S, 220S, 320S: Divided liquid crystal panel flexible circuit boards (Divided flexible circuit boards)

The invention claimed is:
1. A display device comprising:
a display panel;
a flexible circuit board; and
a control board;
a lighting unit configured to irradiate the display panel with light,
the flexible circuit board including:
one end of the flexible circuit board connected to the display panel;
other end of the flexible circuit board connected to the control board;
the lighting unit including:
a plurality of light sources;

a light guide plate having an outer shape conforming to an outer shape of the display panel, and configured to guide light from the plurality of light sources;

a case holding the plurality of light sources and the light guide plate therein, the case including a sidewall portion surrounding at least the light guide plate and the plurality of light sources;

a light source board having an outer shape conforming to the outer shape of the light guide plate, and on which the plurality of light sources are mounted side by side at intervals along a circumferential direction of the light source board to surround the light guide plate, the light source board including:
- at least a plurality of light source mount portions in which the plurality of light sources are mounted, respectively; and
- a plurality of light source interval portions disposed between the light source mount portions that are adjacent with respect to the circumferential direction, the light source interval portions including a cut-out light source interval portion with a cut-out outer edge; and
- a flexible circuit board passing space between the cut-out light source interval portion and the sidewall portion for passing the flexible circuit board therethrough.

2. The display device according to claim 1, wherein
the flexible circuit board includes a plurality of divided flexible circuit boards, and
the light source interval portions include a plurality of the cut-out light source interval portions which are equal to or greater in number than the divided flexible circuit boards.

3. The display device according to claim 2, wherein the plurality of light sources are disposed on the light source board at equal intervals with respect to the circumferential direction.

4. The display device according to claim 2, wherein
the at least two or more light source interval portions disposed between the light source mount portions that are adjacent with respect to the circumferential direction include the cut-out light source interval portions, and
the plurality of divided flexible circuit boards are connected to the display panel respectively through a plurality of the flexible circuit board passing spaces provided between the cut-out light source interval portions and the sidewall portion.

5. The display device according to claim 1, further comprising:
a touch panel having an outer shape conforming to the outer shape of the display panel; and
a touch panel flexible circuit board connected to the touch panel,
wherein the cut-out light source interval portion includes a cut-out light source interval portion forming a touch panel flexible circuit board passing space with the sidewall portion for passing the touch panel flexible circuit board therethrough.

6. The display device according to claim 5, wherein
the touch panel flexible circuit board includes a plurality of divided touch panel flexible circuit boards, and
the light source interval portions include a plurality of the cut-out light source interval portions which are greater in number than the divided touch panel flexible circuit boards.

7. The display device according to claim 6, wherein
a plurality of the light source interval portions that are adjacent via the light source mount portions with respect to the circumferential direction include the cut-out light source interval portions, and
the plurality of divided touch panel flexible circuit boards are connected to the touch panel respectively through the touch panel flexible circuit board passing spaces provided between the plurality of cut-out light source interval portions and the sidewall portion.

8. The display device according to claim 1, wherein some of the plurality of light source interval portions include the cut-out light source interval portions.

9. The display device according to claim 1, wherein all of the plurality of light source interval portions include the cut-out light source interval portions.

10. The display device according to claim 1, wherein the sidewall portion includes, in a portion facing the flexible circuit board passing space, a positioning portion configured to abut on each of the ends of the flexible circuit board with respect to the circumferential direction.

11. The display device according to claim 10, wherein
the light source board has a circular outer shape, and
the positioning portion abuts on each of the ends of the cut-out light source interval portion with respect to the circumferential direction.

12. The display device according to claim 1, wherein the light source board has a ring-shape.

* * * * *